May 19, 1953 P. E. BURBY 2,638,610
LASTING MACHINE
Filed July 18, 1950 15 Sheets-Sheet 1

Inventor
Philip E. Burby
By his Attorney

Inventor
Philip E. Burby
By his Attorney

May 19, 1953     P. E. BURBY     2,638,610
LASTING MACHINE

Filed July 18, 1950     15 Sheets—Sheet 3

Inventor
Philip E. Burby
By his Attorney

May 19, 1953  P. E. BURBY  2,638,610
LASTING MACHINE
Filed July 18, 1950  15 Sheets-Sheet 4
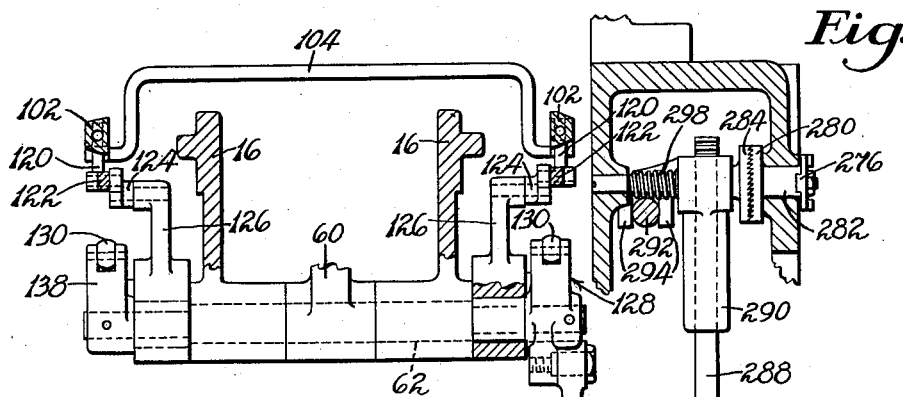
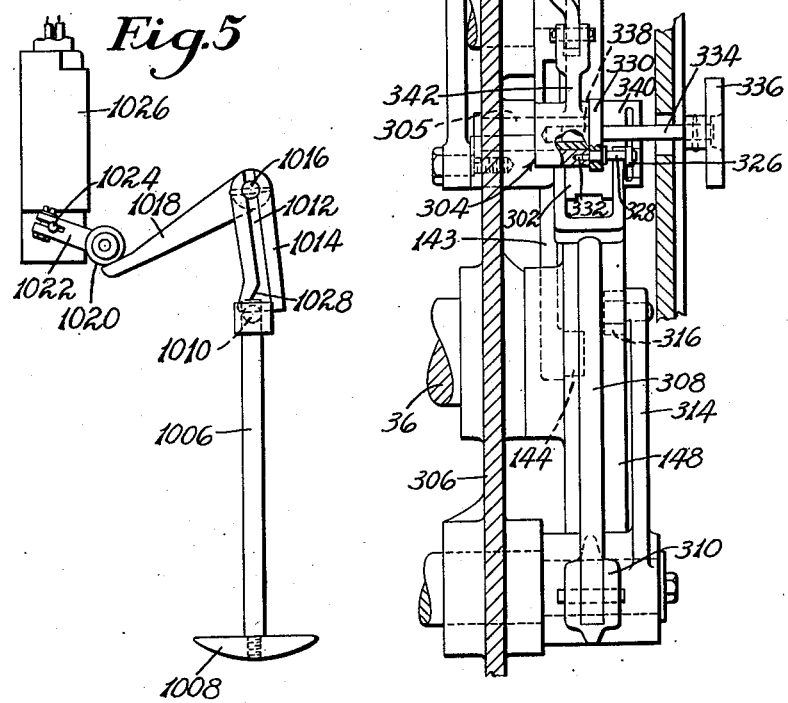
*Inventor*
Philip E. Burby
By his Attorney

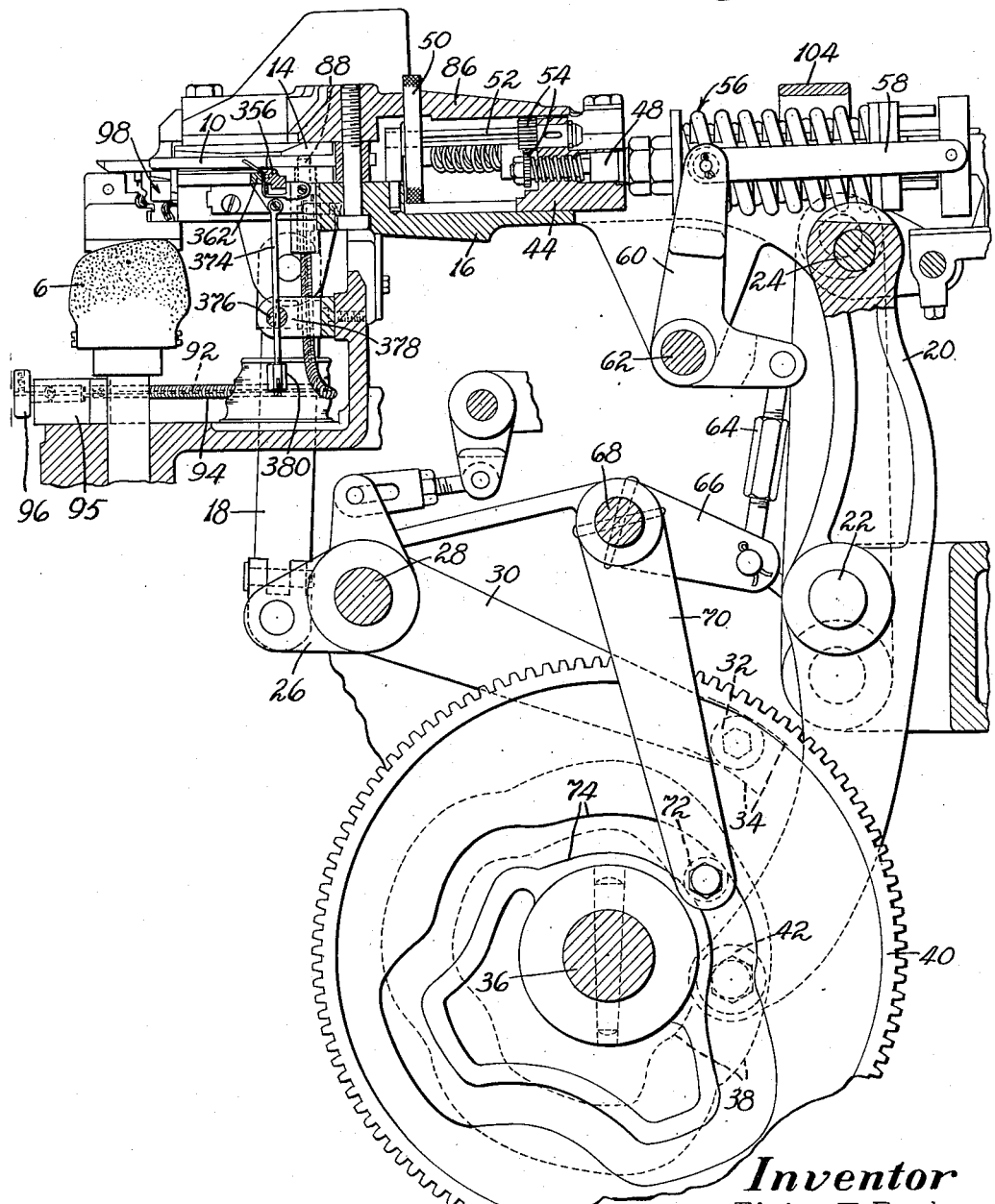

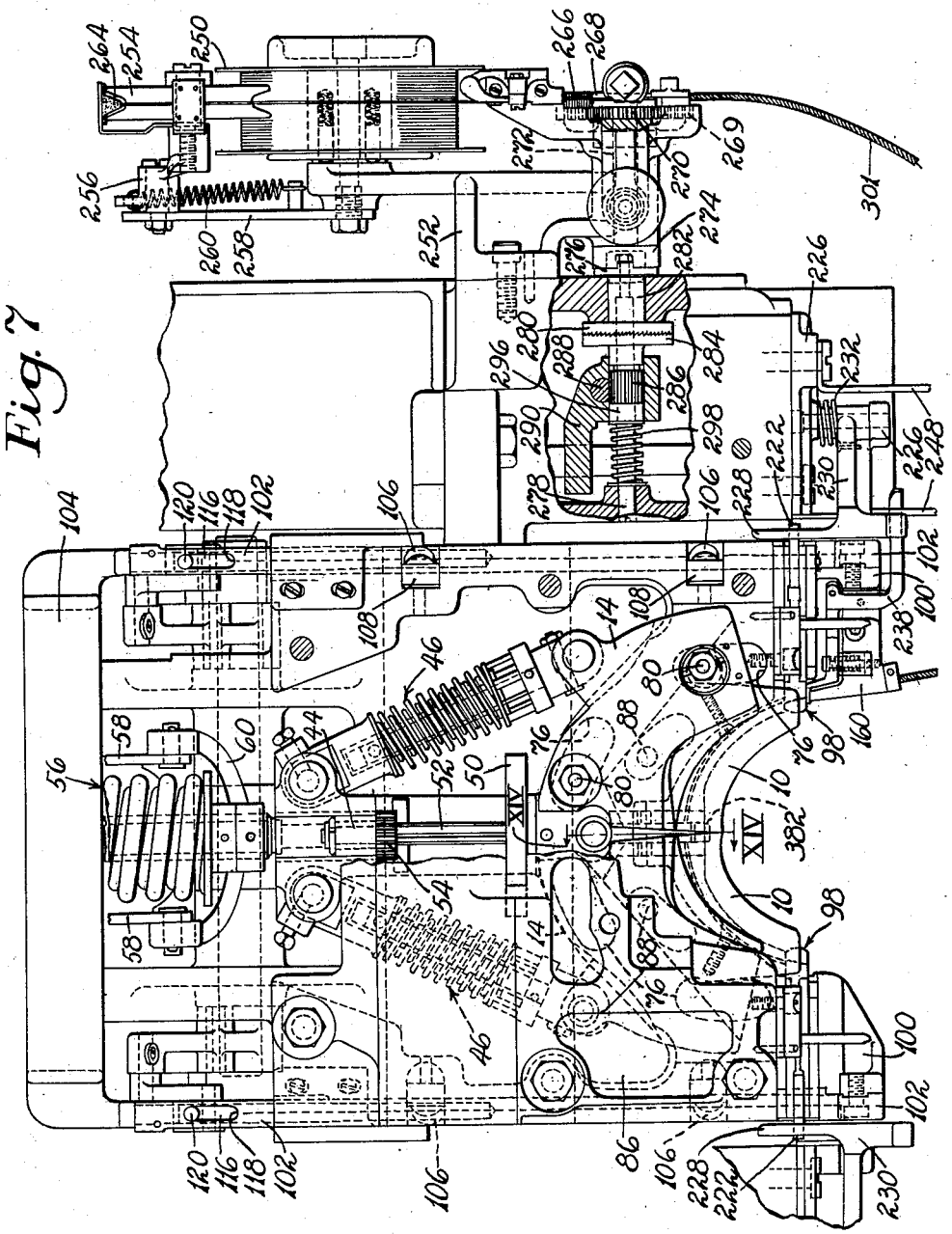

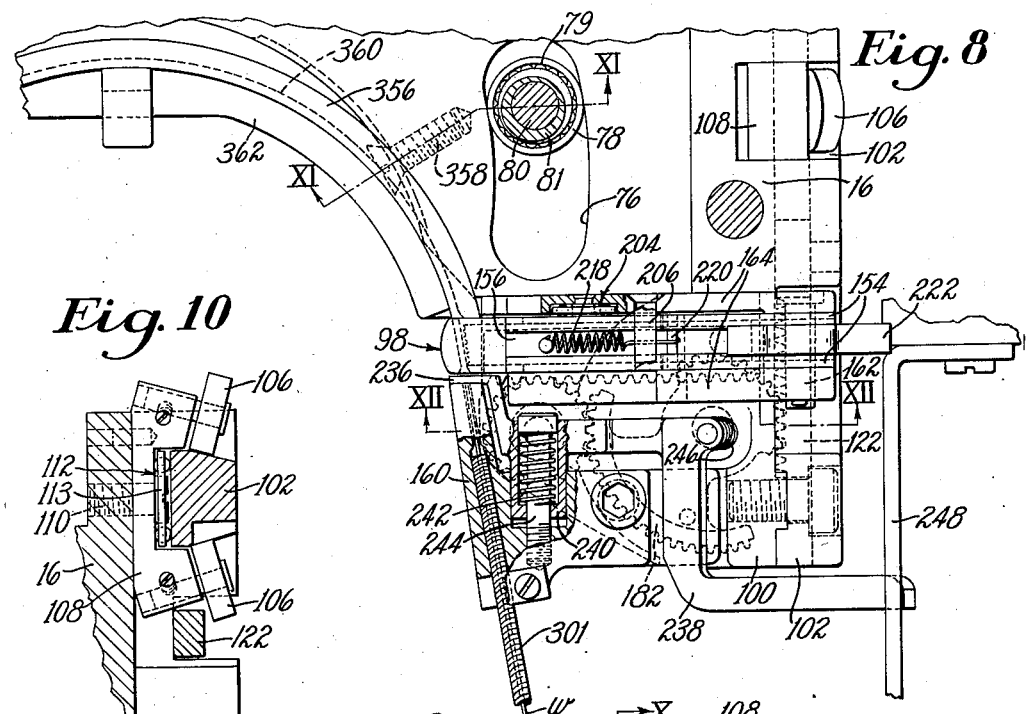
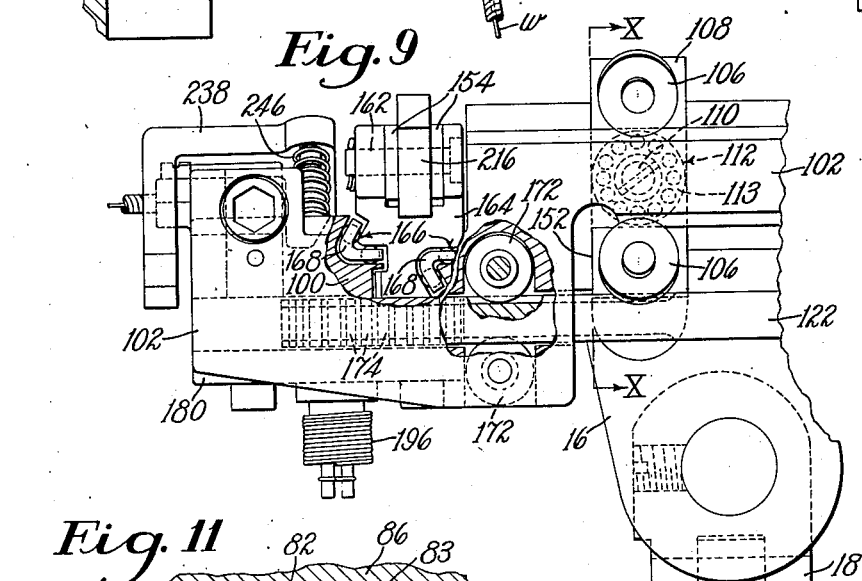
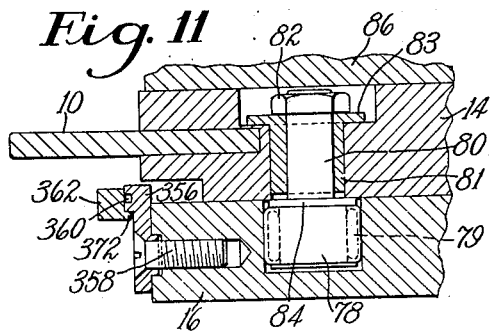

May 19, 1953  P. E. BURBY  2,638,610
LASTING MACHINE
Filed July 18, 1950  15 Sheets-Sheet 8
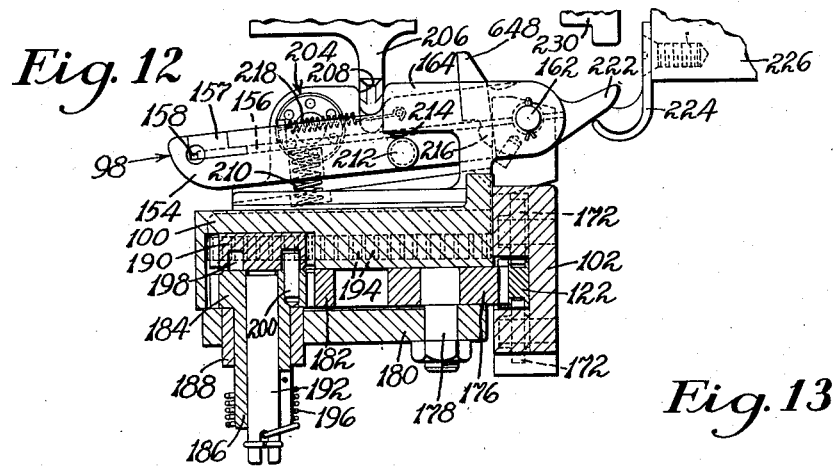
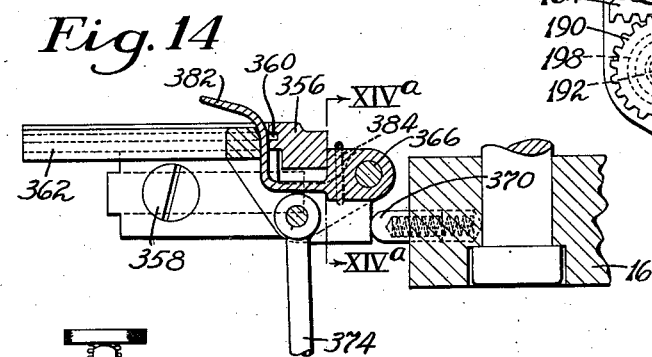
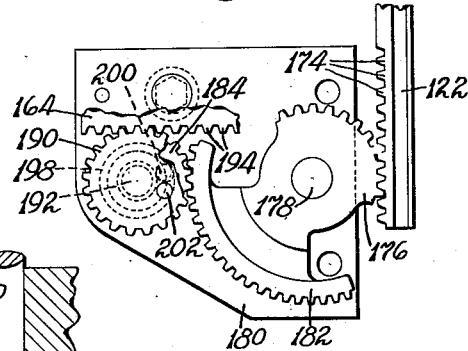
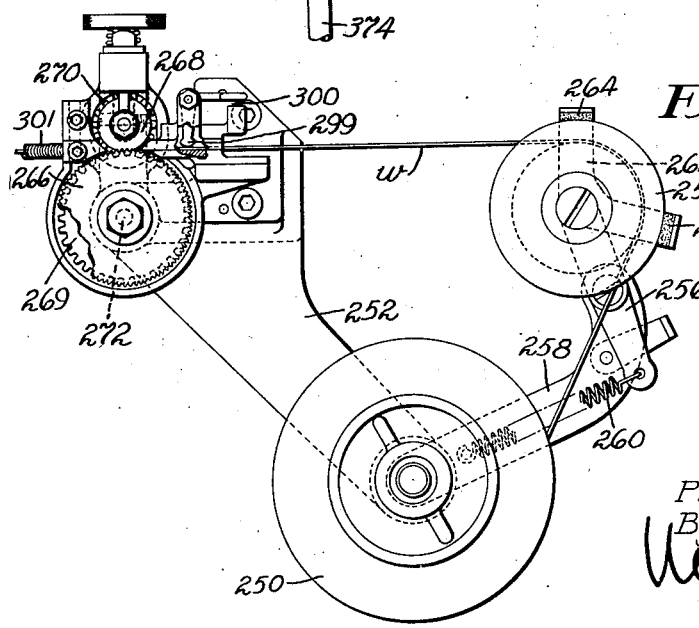
Inventor
Philip E. Burby
By his Attorney

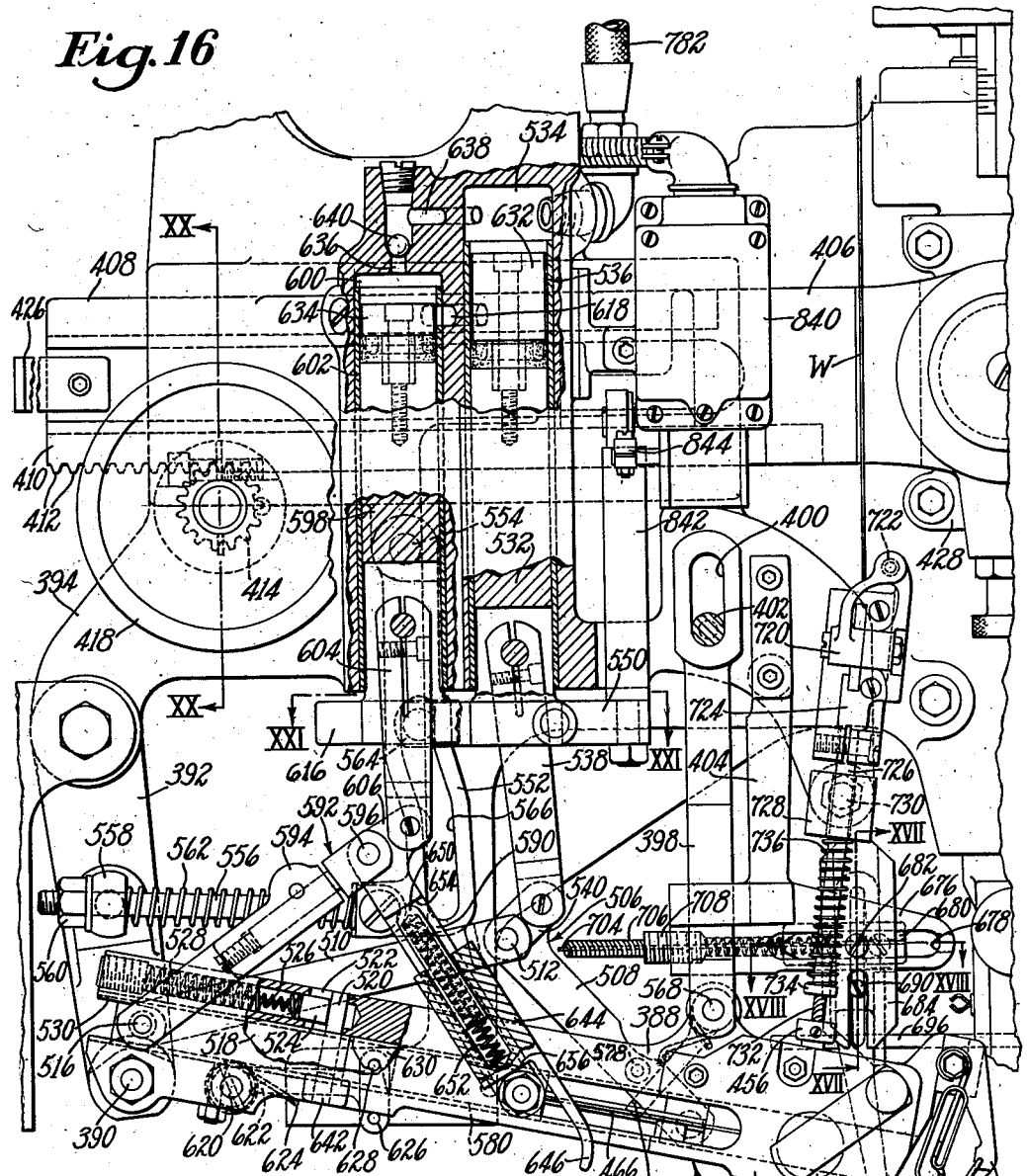

May 19, 1953 P. E. BURBY 2,638,610
LASTING MACHINE
Filed July 18, 1950 15 Sheets-Sheet 10

*Inventor*
Philip E. Burby
By his Attorney

May 19, 1953   P. E. BURBY   2,638,610
LASTING MACHINE
Filed July 18, 1950   15 Sheets-Sheet 11
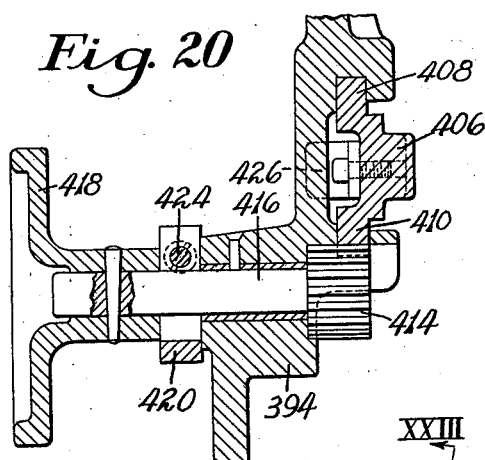
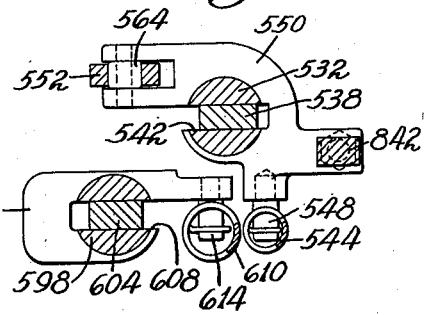
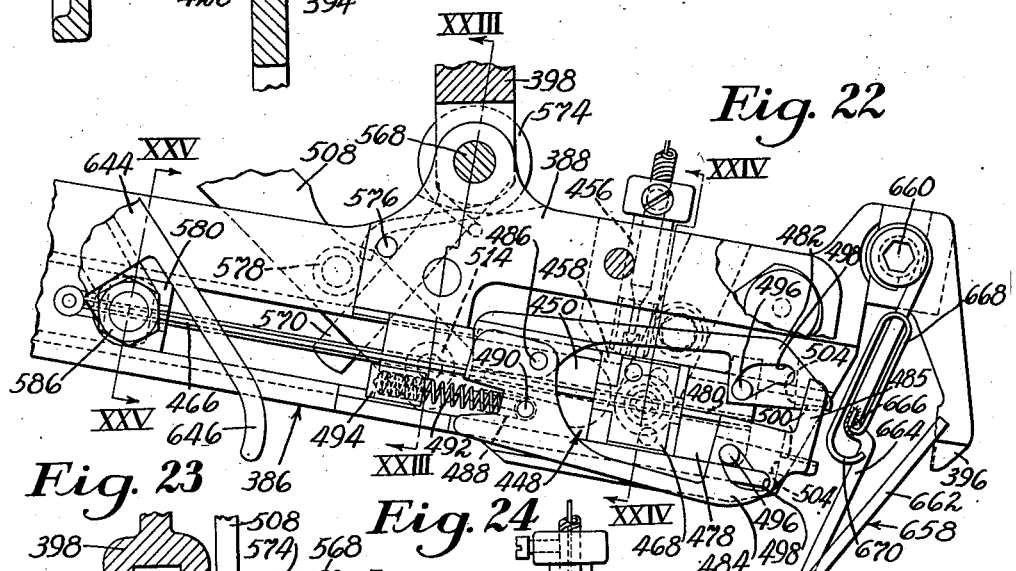
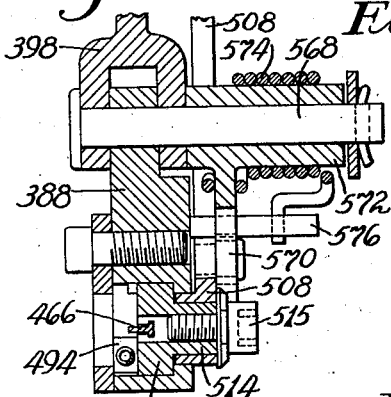
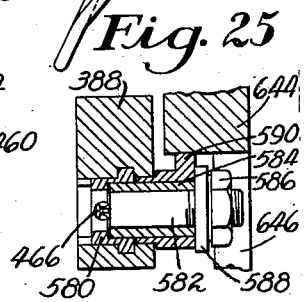
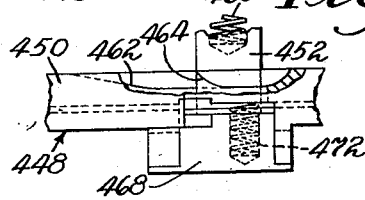
Inventor
Philip E. Burby
By his Attorney

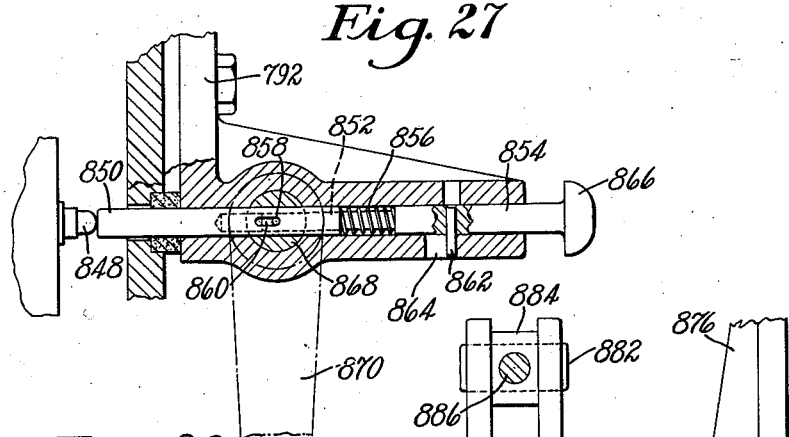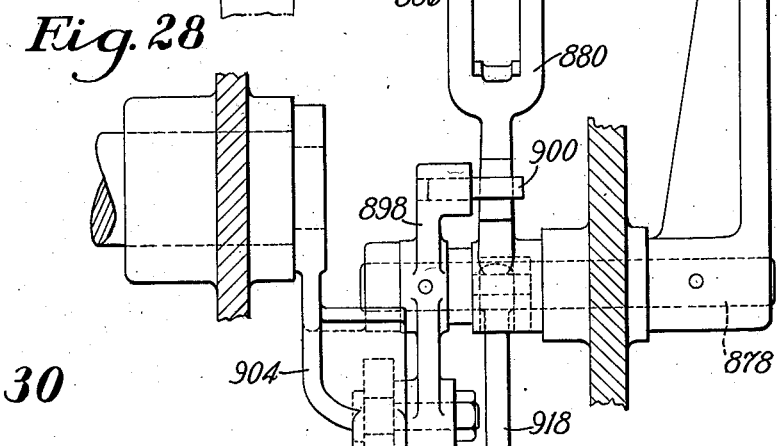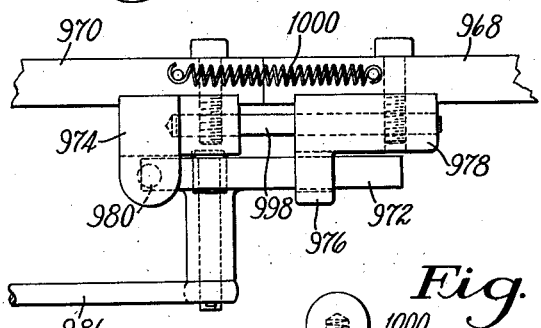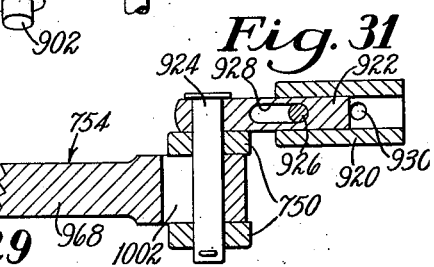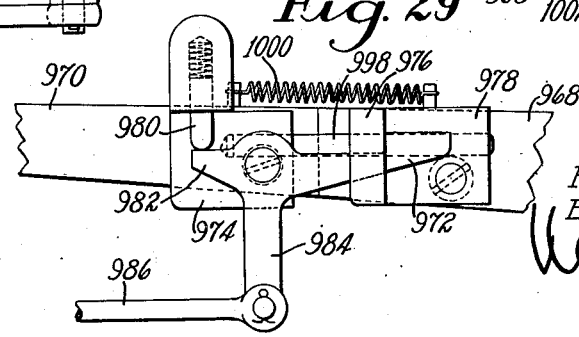

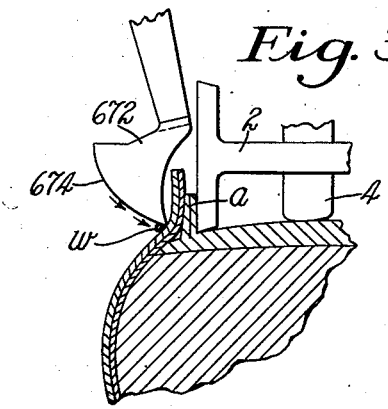
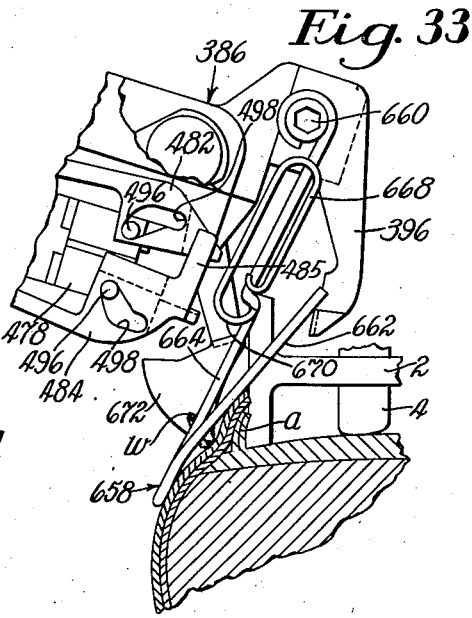
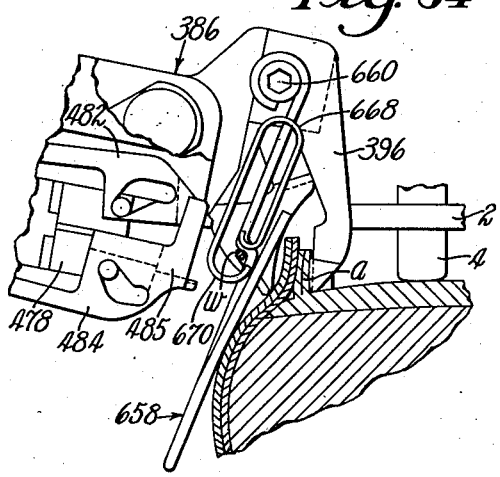
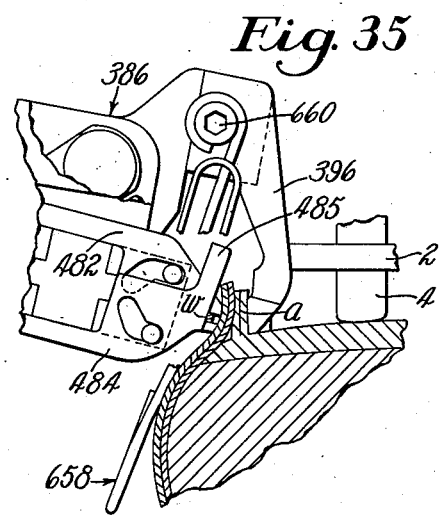
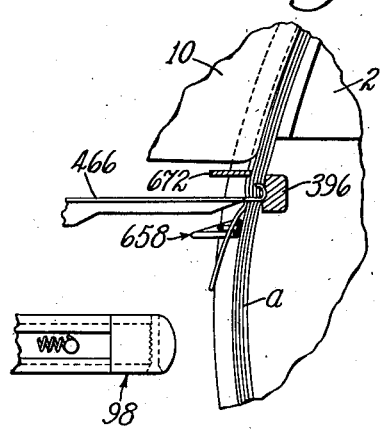

May 19, 1953 P. E. BURBY 2,638,610
LASTING MACHINE
Filed July 18, 1950 15 Sheets-Sheet 14

*Inventor*
Philip E. Burby
By his Attorney

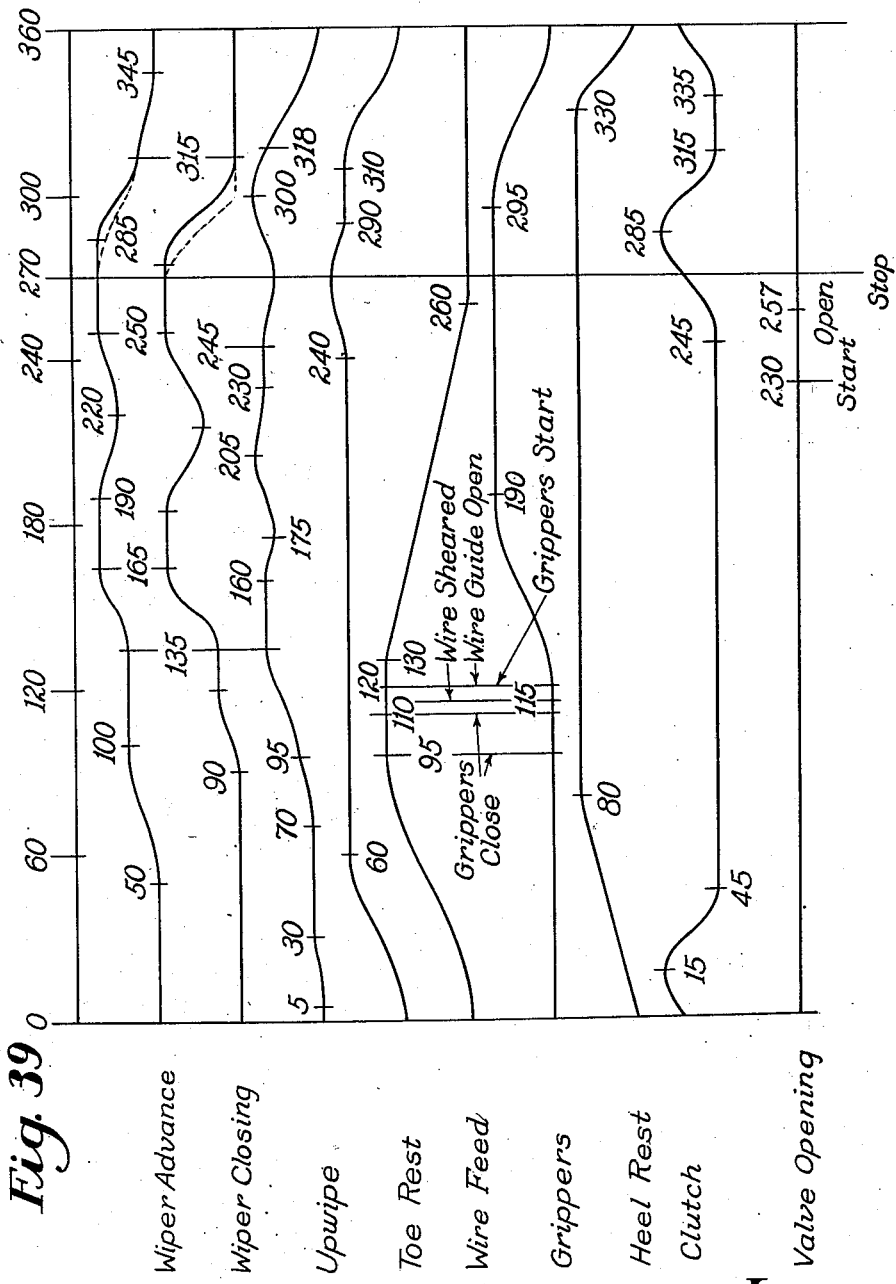

UNITED STATES PATENT OFFICE 2,638,610

LASTING MACHINE

Philip E. Burby, Beverly, Mass., assignor to United Shoe Machinery Corporation, Flemington, N. J., a corporation of New Jersey Application July 18, 1950, Serial No. 174,439

72 Claims. (Cl. 12—8.7)

This invention relates to lasting machines, and in some aspects more particularly to machines for lasting the toe ends of welt shoes. In United States Letters Patent No. 2,420,684, granted on May 20, 1947 on an application of C. A. Robinson's, there is disclosed, in a power-operated toe-lasting machine, automatic means for applying a wire binder about the toe end of a welt shoe to hold the upper in lasted position and for fastening the binder by driving staples through the margin of the upper and a lip on the insole at the opposite sides of the shoe bottom. It is one object of this invention to provide improvements in such binder-applying and fastening means, and the invention is accordingly herein shown as embodied in means forming part of an organization of the same general character as disclosed in said Letters Patent. It is to be understood, however, that in various novel aspects it is not limited to the particular embodiment hereinafter described.

In general accordance with the disclosure of the above-mentioned Letters Patent the machine herein shown, which has toe-embracing wipers for wiping the marginal portion of the toe end of a welt shoe upper inwardly over the feather and against the lip of the insole, is provided with grippers for gripping at the opposite sides of the shoe respectively a wire binder extending around the toe end of the upper and for pulling it lengthwise of the shoe inwardly under the wipers to apply it to the upstanding margin of the upper lying against the lip of the insole, and with means for feeding binder wire around the toe from one of the grippers to the other gripper. To adapt the machine better for operation on shoes of different sizes, the construction herein shown includes means for adjustably varying the amount of wire thus fed around the toe and means for moving the grippers a variably predetermined distance lengthwise of the shoe depending upon the amount of wire thus fed before they grip the binder. More particularly, as herein illustrated, the variation in the feed of the wire is effected by varying the throw of a lever included in the wire-feeding means, and by the movement of this lever in the wire-feeding operation a correspondingly variable positioning movement lengthwise of the shoe is imparted to the grippers through mechanism whereby they are thereafter operated to pull the binder.

When the grippers first grip the binder they are located at substantial distances from the upper widthwise of the shoe and it is necessary to move them inwardly toward the upper to assist in positioning the binder in proper relation to the shoe. The invention further provides novel means for thus moving the grippers inwardly in response to resistance of the shoe to their binder-applying movement lengthwise of the shoe. In the construction herein shown gripper-supporting means movable to carry the grippers lengthwise of the shoe has mounted thereon gear mechanisms associated respectively with the different grippers for moving them inwardly into engagement with the shoe, these gear mechanisms being connected to rack bars which are moved lengthwise of the shoe with the gripper-supporting means until the above-mentioned resistance is encountered, after which the rack bars by continued movements operate the gear mechanisms to impart the inward movements to the grippers. Included in each gear mechanism are two gears relatively movable against the resistance of a spring after engagement of the gripper with the shoe.

In the machine to which the invention is herein shown as applied the wipers, after wiping the marginal portion of the upper inwardly, are partially retracted lengthwise and widthwise of the shoe and are also raised slightly to relieve their pressure on the upper, after which they are again moved inwardly and are forced downwardly to apply the final pressure. It is at the time when the wipers are thus partially retracted that the binder, under the force applied thereto by the grippers, is pulled fully inward against the upstanding margin of the upper. To insure that the binder along the sides of the toe will not at this time assume too high a position against the upstanding margin of the upper by reason of the retractive movements of the wipers, instead of lying as near as possible to the apex of the angle between the feather and the lip of the insole, the machine is further provided with holddown members arranged to engage the binder in locations which are close to the front ends of the wipers when the wipers are in their fully advanced and closed positions and thus to prevent the binder from springing up between the edges of the wipers and the margin of the upper when the wipers are retracted. These holddown members are held in retracted positions widthwise of the shoe when the shoe is presented to the machine and are moved inwardly toward the shoe into positions thus to control the binder after the starting of the machine. In the machine shown the wipers are supported on a wiper carrier which is first moved heightwise of the shoe to cause the wipers to wipe the upper in that direction, and the positioning movements of the binder holddown members are controlled by this movement of the wiper carrier. More particularly, supports for the holddown members are connected by flexible cables to the wiper carrier and are held thereby initially in retracted positions widthwise of the shoe, and as the wiper carrier is moved heightwise of the shoe springs move the supports inwardly toward the shoe as permitted by the cables. Each holddown member has an edge face which is convex widthwise and heightwise of the shoe to assist in guiding the binder to its proper position against the upstanding margin of the upper as it is applied to the upper by the grippers.

To fasten the binder to the shoe the machine is provided with fastening-inserting mechanisms which form staples from fine wire and insert or drive them through the margin of the upper and the lip of the insole in positions to straddle the binder at the opposite sides of the shoe bottom respectively, the staples being thus inserted in locations a short distance beyond the wipers in a heelward direction when the wipers are fully advanced and closed. In this operation it is important that the binder be located exactly in the correct relation to the path of each staple. Each fastening-inserting mechanism includes a throat member having a guideway for the staple and means for moving the throat member inwardly toward the shoe before the staple is driven; and for purposes of this invention each throat member has associated therewith a pair of binder-positioning members which are relatively movable heightwise of the shoe to engage and position the binder between them in a location between the throat member and the shoe. In the construction shown these binder-positioning members are moved initially inward toward the shoe with the throat member, after which their further inward movement is retarded by engagement with the binder held taut by the grippers as the throat member continues its movement. In response to this resistance of the binder to the inward movements of the binder-positioning members they are moved equal distances toward each other by the continued movement of the throat member until they position the binder between them in exactly the right relation to the path of movement of the staple. Near the end of the movement of the throat member it engages shoulders on the binder-positioning members and forces them farther inwardly with the binder into enengagement with the upper, the movement of the throat member thus being limited by the binder-positioning members in engagement with the shoe. These members have in their inner end portions staple guideways arranged to aline with the guideway in the throat member. While the fastening-inserting mechanisms in the machine herein shown are thus constructed to use staples, it should be understood that in various novel aspects the invention is not dependent upon the use of fastenings of that particular character.

To insure that the above-mentioned binder-positioning members will be properly effective to position and control the binder as described it is necessary that as they are moved inwardly toward the shoe the portions of the binder on which they act shall first be spaced somewhat away from the upper widthwise of the shoe. The machine is accordingly further provided with what may be termed binder-spreading devices which, as shown, are moved heightwise of the shoe in locations between the grippers and the binder-positioning members to insure that the portions of the binder acted upon by these members will be properly spaced from the shoe. In the machine herein shown the fastening-inserting mechanisms, prior to the insertion of the fastenings, are swung heightwise of the shoe to positions determined by engagement of staple-clinching anvil members thereon with the bottom of the insole, and the binder-spreading devices are carried by these mechanisms to act as described on the binder as the mechanisms are thus moved heightwise of the shoe. Each of these devices in the construction herein shown is made of resilient wire formed to provide a substantially V-shaped portion which is inserted between the binder and a portion of the upper already lasted in a location immediately beyond the unlasted toe portion in a heelward direction, the V-shaped portion being contractible in response to pressure of the binder thereon.

In accordance with another feature, the invention provides means for bending the free end portions of the binder extending beyond the fastenings heightwise of the shoe after the fastenings have been inserted and the binder has been released by the grippers. This insures that the grippers in their return movements will not engage the ends of the binder and possibly detach it from the shoe, and also affords better insurance that the fastenings will hold the binder securely without slippage. For the purpose in view the above-mentioned binder-spreading devices have mounted thereon members which bend the end portions of the binder as above described in response to reverse movements of the fastening-inserting mechanisms heightwise of the shoe after the insertion of the fastenings. As these mechanisms are moved heightwise of the shoe to fastening-inserting positions, at which time the binder is held taut by the grippers, hook-shaped portions of the bending members, which are resilient, slip past the binder and assume the proper positions thus to act later on the end portions of the binder.

Each of the fastening-inserting mechanisms, which may be termed stapling units, includes a staple-forming member which is moved through a toggle to form a staple and a cutter movable with the staple-forming member to cut from wire a piece for use in making the staple. Because of the resistance of the wire to the movement of the cutter the first effect of the toggle-operating means is to swing the unit downwardly until its anvil member engages the insole, after which the wire is cut and the staple is formed. It will be evident that upon the cutting of the wire the force acting through the toggle and tending to hold the anvil member down on the insole is substantially reduced. To insure that the anvil member will still be held firmly down on the insole with the unit in proper relation to the shoe, the machine herein shown is provided with additional means for applying to each unit force tending to prevent reverse movement thereof heightwise of the shoe after the cutting of the wire. For this purpose, in the construction shown, each unit has thereon an arm mounted for swinging movement against the resistance of a spring, and one link of the toggle has thereon a roll arranged to engage and swing the arm as the toggle is further operated after the cutting of the wire.

In the construction shown the swinging movement of each stapling unit into proper relation to the shoe is, as above suggested, a downward movement, and by reason of the engagement of the above-mentioned cutter with the wire a downward feeding movement from a source of supply is imparted to the wire as the unit is swung downwardly. After the stapling operation each unit is swung upwardly to a positively determined initial position, the lower end portion of the wire thus fed being received within the unit for use in forming the next staple. To insure that the proper length of wire will thus enter the unit, the latter has means for engaging the end of the wire and for lifting the wire a short distance as the unit approaches the limit of its upward movement. To insure against forming any kink in the wire because of this action of the unit thereon, a brake member past which the wire is fed downwardly is so mounted as to be moved upwardly by the lifting action of the unit on the wire. Extending downwardly, moreover, from this brake member is a non-flexible tube which is thus movable upwardly with the brake member against the resistance of a light spring and within which is positioned a flexible conduit connected to the unit for guiding the wire.

The machine is driven by an electric motor and includes a clutch through which a cycle of operations is performed, the clutch being actuated first by a treadle to start the cycle. After the binder has been applied to the shoe but prior to the operations of the fastening-inserting mechanisms the cycle of operations is automatically interrupted by control of the clutch. Immediately prior to this interruption of the cycle a valve is moved automatically into position to admit operating fluid, supplied by a pump driven by the motor, to fluid-operated means by which the fastening-inserting mechanisms are operated, the valve being retained by a latch in the position to which it is thus moved until released by fluid-pressure means after the fastening-inserting operations, whereupon it is returned by a spring. It may sometimes be desired, as for test purposes, to cause the fastening-inserting mechanisms to operate independently of any cycle of operations of the machine, and accordingly the machine is provided with a hand lever by which the valve may be moved into position thus to admit the fluid. As a safety measure, the construction herein shown includes means for preventing the valve, when thus moved by the hand lever, from being held by the latch if the motor which drives the machine and the pump is not running, so that under those conditions the valve will be immediately returned on release of the hand lever. This insures that the fastening-inserting mechanisms, if the valve has been moved by the hand lever without the knowledge of the operator, will not immediately operate in response to the starting of the motor. For the purpose in view the latch is so controlled by a solenoid in the motor circuit that it is in a position where it will hold the valve only if the circuit is closed. Associated also with the valve-operating mechanism is a device which is moved by that mechanism into position to prevent actuation of the clutch by the treadle whenever the fastening-inserting mechanisms are operating, either in the normal operation of the machine or as the result of movement of the hand lever, thus avoiding danger of possible damage to the machine.

It may sometimes be desired, as for test purposes, to run the machine without operating the fastening-inserting mechanisms, and accordingly the machine herein shown is further provided with means which may be used to render the valve-operating mechanism, regardless of its movement, ineffective to operate the valve. More particularly, a valve-operating member, which is normally moved automatically to operate the valve prior to the pause in the cycle, is displaceable to prevent it, even though it receives such movement, from acting on the valve, and means movable by the operator is provided for thus displacing it. This member, moreover, is a part of the means for operating the valve by the above-mentioned hand lever, and accordingly its displacement will further prevent starting of the fastening-inserting mechanisms by the hand lever. If the machine is operated, as it sometimes may be for test purposes, without any shoe therein, it is desirable to prevent at that time the operation of the fastening-inserting mechanisms, and accordingly the machine further includes automatic means dependent upon the absence of a shoe for preventing the operation of the above-mentioned valve. In the construction shown this also is accomplished by displacement of the above-mentioned valve-operating member.

The above and other features of the invention, including various novel details of construction and combinations of parts, will now be more particularly described with reference to the accompanying drawings and thereafter pointed out in the claims.

In the drawings,

Fig. 4 is a view in front elevation of portions of the structure shown in Fig. 3, with parts broken away;

Fig. 5 is a detail view in right-hand side elevation of safety means included in the machine;

Fig. 6 is a view partly in right-hand side elevation and partly in section, showing the wiper-operating mechanism and parts associated therewith;

Fig. 7 is a plan view showing portions of the wiper-operating mechanism and of the binder-applying and wire-feeding means, with parts broken away;

Fig. 8 is an enlarged view generally similar to Fig. 7 of a portion of the structure, with parts removed and others broken away;

Fig. 9 is a view mainly in right-hand side elevation of the structure shown in Fig. 8;

Fig. 10 is a section on the line X—X of Fig. 9;

Fig. 11 is a section on the line XI—XI of Fig. 8, showing also certain parts not included in Fig. 8;

Fig. 12 is a section on the line XII—XII of Fig. 8, with parts omitted;

Fig. 13 is a plan view of certain parts shown in Fig. 12;

Fig. 14 is a section on the line XIV—XIV of Fig. 7;

Fig. 14a is a section on the line XIVa—XIVa of Fig. 14;

Fig. 15 is a view in right-hand side elevation of a portion of the structure shown in Fig. 7;

Fig. 16 is a view in front elevation on an enlarged scale, with parts broken away, showing the left-hand fastening-inserting mechanism and parts associated therewith;

Fig. 17 is a section on the line XVII—XVII of Fig. 16;

Fig. 18 is a section on the line XVIII—XVIII of Fig. 16;

Fig. 20 is a section on the line XX—XX of Fig. 16;

Fig. 21 is a section on the line XXI—XXI of Fig. 16;

Fig. 22 is a view similar to Fig. 16 on an enlarged scale of a portion of the structure, with parts broken away;

Fig. 23 is a section on the line XXIII—XXIII of Fig. 22;

Fig. 24 is a section on the line XXIV—XXIV of Fig. 22;

Fig. 25 is a section on the line XXV—XXV of Fig. 22;

Fig. 26 is mainly a plan view, with parts removed, of portions of the structure shown in Fig. 24;

Fig. 27 is a section on the line XXVII—XXVII of Fig. 2;

Fig. 28 shows mainly in elevation a portion of the structure shown at the upper right-hand side of Fig. 2, as viewed from the left with reference to Fig. 2;

Fig. 29 is a view in left-hand side elevation, on an enlarged scale, of a portion of the structure shown near the bottom of Fig. 2;

Fig. 30 is a plan view of the same parts as shown in Fig. 29;

Fig. 31 is a section on the line XXXI—XXXI of Fig. 2;

Fig. 32 is a view in front elevation of the left-hand binder holddown member and of parts of the shoe-positioning means, illustrating the operative relation of this member to the binder and to a shoe shown in section;

Fig. 33 shows in front elevation portions of the left-hand fastening-inserting mechanism and parts associated therewith as they appear in relation to a shoe after the binder has been applied to the shoe by the grippers but prior to the downward swinging movement of the fastening-inserting mechanism;

Fig. 34 is a view similar to Fig. 33, showing the positions of the parts after the downward swinging movement of the fastening-inserting mechanism;

Fig. 35 is a view similar to Fig. 34, showing the positions of the parts after the binder has been properly positioned heightwise of the shoe and has been forced inwardly toward the upper by the binder-positioning members, but prior to the insertion of the staple;

Fig. 36 is mainly a plan view, with parts in section, showing the left-hand staple driver and other parts as they appear when the driver is at the end of its driving movement;

Fig. 39 is a cam chart illustrating the timing of certain operations that take place in the course of the cycle.

Figure 1:
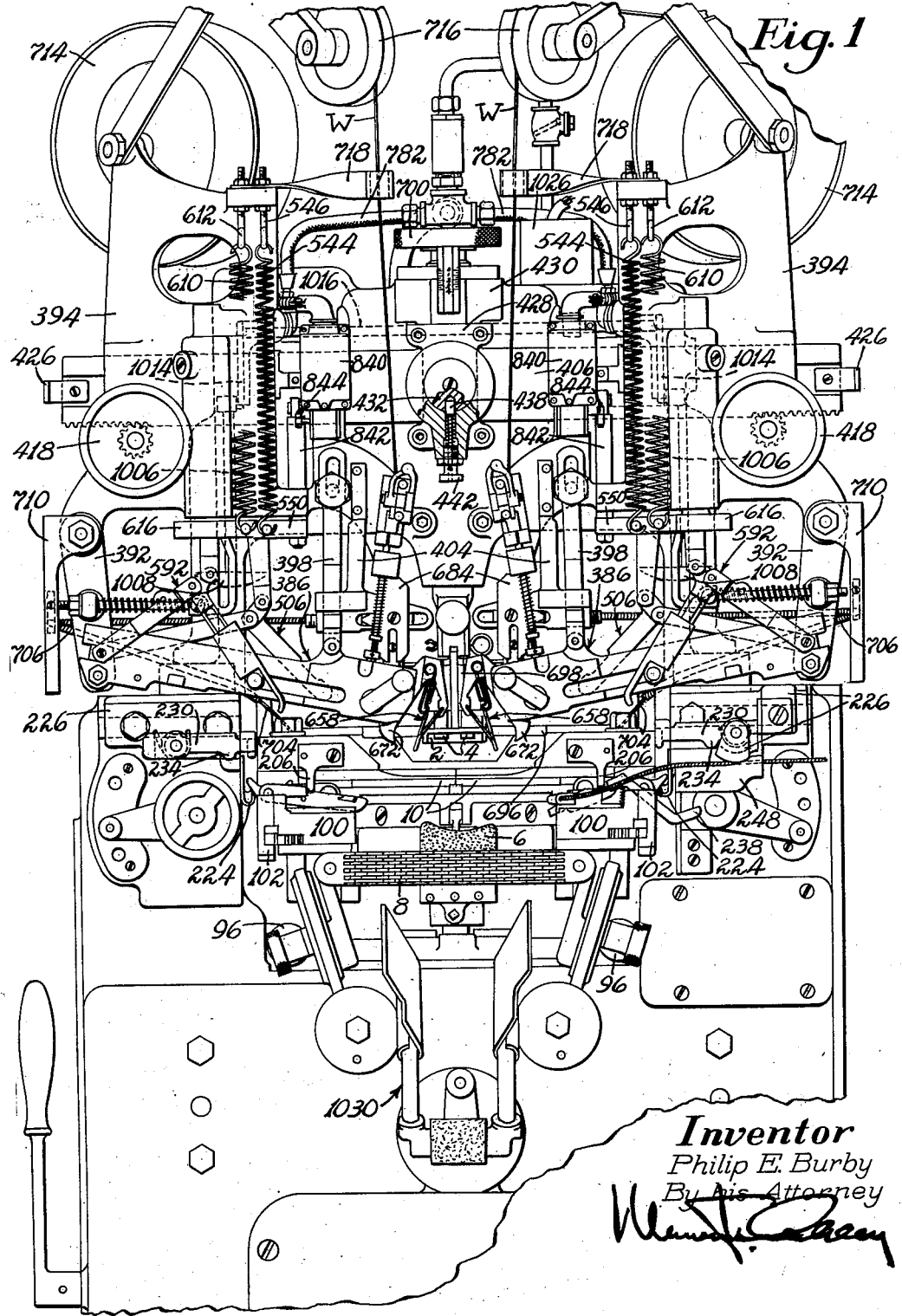
Fig. 1 is a view in front elevation of the upper portion of the machine to which the invention is herein shown as applied, with parts broken away.

Such parts of the machine herein shown as are common to the disclosures of prior Letters Patent, including the above-mentioned Letters Patent No. 2,420,684, will be hereinafter described only in so far as is necessary for an understanding of the invention. For positioning the shoe, bottom upward, both lengthwise and laterally the machine is provided with a plate 2 (Figs. 1 and 32) having a downwardly extending flange formed to engage the inner face of the lip *a* of the insole around the toe-end portion of the insole in the manner disclosed in Letters Patent No. 2,385,414, granted on September 25, 1945 on an application of E. A. Holmgren's. As further therein disclosed, the shoe is positioned heightwise by three insole-engaging pins, two of which are shown at 4 (Fig. 1), the plate 2 being movable upwardly with the shoe until the pins engage the insole in response to pressure applied to the shoe by an upwardly movable toe rest 6 at the beginning of the cycle of operations of the machine. At the beginning of the cycle also a heel rest 8 is moved rearwardly into engagement with the heel end of the shoe to assist in holding it against lengthwise displacement.

For wiping the toe end of the upper into lasted position the machine has a pair of wipers 10 which are advanced lengthwise of the shoe and are closed inwardly widthwise of the shoe to embrace the upper about the toe end of the last and are swung upwardly to wipe the upper heightwise of the last, after which they are further advanced and closed to wipe the marginal portion of the upper inwardly over the feather and against the lip of the insole, the lip being supported against the inward pressure of the wipers by the plate 2. To assist in controlling the upper as it is wiped heightwise of the last the machine is provided with a retarder (not shown) which clamps the marginal portion of the upper outspread on the wipers. The construction of this retarder and of the means for operating and controlling it may be assumed to be substantially as disclosed in Letters Patent No. 2,380,407, granted on July 31, 1945 on an application of mine.

The wipers 10 are detachably secured in slots in wiper holders 14 (Figs. 6 and 7) which are supported on a wiper carrier 16 and are guided by means hereinafter described for movements about an axis extending heightwise of the shoe to close the wipers inwardly widthwise of the shoe. The wiper carrier 16 is supported and operated by means constructed substantially as disclosed in Letters Patent No. 2,160,846, granted on June 6, 1939 on an application of F. C. Eastman's and A. F. Pym's. Briefly, the carrier is supported near its front end on a pair of links 18, only one of which is shown, and at its rear end on the upper end of a lever 20 pivotally mounted between its upper and lower ends on a rod 22. The lever is pivotally connected at its upper end to the carrier by a rod 24. The links 18 are pivotally connected at their lower ends to arms 26, only one of which is shown, these arms being fast on a rockshaft 28 mounted in bearings in the frame. Also fast on this rockshaft is an arm 30 provided with a roll 32 which lies in a cam track 34 formed in one side of a cam member (not shown) on a cam shaft 36. Through this mechanism the wiper carrier 16 is swung upwardly about the rod 24 to cause the wipers to wipe the upper heightwise of the last and is later swung downwardly to increase the pressure of the wipers on the marginal portion of the upper over the insole. To advance and retract the wiper carrier and the wipers lengthwise of the shoe, the lever 20 is swung about the rod 22 by a cam track 38 formed in one side of a gear wheel 40 on the cam shaft 36, the lever having thereon a roll 42 which lies in the cam track.

For operating the wiper holders 14 to close the wipers inwardly widthwise of the shoe, there is mounted on the wiper carrier 16 (Figs. 6 and 7) a slide 44 between which and the wiper holders there are yieldable connections 46 of the same construction as disclosed in Letters Patent No. 2,354,663, granted on August 1, 1944 on an application of mine. The slide 44 is operated through a rod 48 the front end portion of which is threaded therein, and by turning the rod the slide may be adjusted lengthwise of the shoe relatively to the wiper carrier 16 to adjust the wiper holders 14 and the wipers toward or from each other. For this purpose there is provided mechanism which need not be described in detail since it is of the same construction as disclosed in the last-mentioned Letters Patent, this mechanism including a hand wheel 50 corresponding to the wheel 262 in said Letters Patent and connected to the rod 48 through a shaft 52 and gearing 54. Operative movement is imparted to the rod 48 through spring mechanism 56 by a pair of links 58 connected to a bell-crank lever 60 mounted on a shaft 62 supported in a depending portion of the wiper carrier 16, substantially as disclosed in greater detail in Letters Patent No. 2,160,846. The bell-crank lever 60 is connected by a link 64 to an arm 66 fast on a rockshaft 68 on which is also secured an arm 70 provided with a roll 72 lying in a cam track 74 in the gear wheel 40. In the construction herein shown the lever 60 is loosely mounted on the shaft 62.

In the machine herein shown the wiper holders 14 are each guided for wiper-closing movement by two slots 76 (Figs. 7 and 8) formed in the wiper carrier 16 and rolls 78 movable with the wiper holder and lying in these slots under the holder, one of the rolls being shown in Figs. 8 and 11. To permit the rolls to turn more freely they are mounted on roller bearings 79 located between them and the lower end portions of studs 80 carried by the wiper holder. The foremost stud 80 associated with each wiper holder has mounted thereon within the holder an eccentric bushing 81, and accordingly by the turning of this bushing the wiper holder may be adjusted about the axis of the other stud. By such adjustment of the two wiper holders any slight space that may in time occur between the wipers at the end of the toe because of wear may be eliminated. Each bushing 81 is secured in adjusted position by a nut 82 threaded on the upper end of the stud 80 and clamping a flange 83 on the bushing against the wiper holder 14 in a recess in the holder, the nut also securing the stud 80 in place by forcing a flange 84 thereon against the lower face of the holder 14 within the slot 76. Adjustment of either bushing is effected after removal of a cover plate 86 on the wiper carrier 16. On the rearmost studs 80 there are also nuts 82 for securing the studs in place, but no eccentric bushings.

Each wiper 10 is held detachably in the slot in the corresponding wiper holder 14 by a pin 88 (Fig. 7) corresponding to the pin 152 shown in Letters Patent No. 2,160,846. Each of these pins heretofore has been movable downwardly against the resistance of a spring by means of a knob on its lower end to release the wiper in order to permit substitution of different wipers. To relieve the operator of the necessity of having to reach inwardly under the wiper carrier in order thus to move the pins 88 downwardly, the machine herein shown is provided with flexible wire cables 92, one of which is shown in Fig. 6, connected respectively to the different pins 88 and mounted in flexible guides 94 extending downwardly and forwardly and secured at their front ends in blocks 95 fast on the frame of the machine. On the front end of each cable is secured a knob 96 having a diametrically reduced portion guided in the block 95, and by this knob the operator may pull forwardly on the cable to impart downward movement to the pin 88 when it is desired to release the wiper and may push rearwardly on it to return the pin, the spring provided heretofore being omitted as unnecessary.

As explained in Letters Patent No. 2,420,684, the timing of the movements of the wipers 10 is such that after they have wiped the marginal portion of the upper inwardly over the insole they are partially retracted lengthwise and widthwise of the shoe and are raised slightly to relieve their downward pressure on the upper, after which they are again moved inwardly and are forced downwardly to apply the final pressure to the upper. At this point the cycle of operations of the machine is automatically interrupted to permit a wire binder, applied to the toe as hereinafter described in proper time relation to the above-mentioned movements of the wipers, to be fastened to the shoe during a pause in the cycle.

Figure 3:
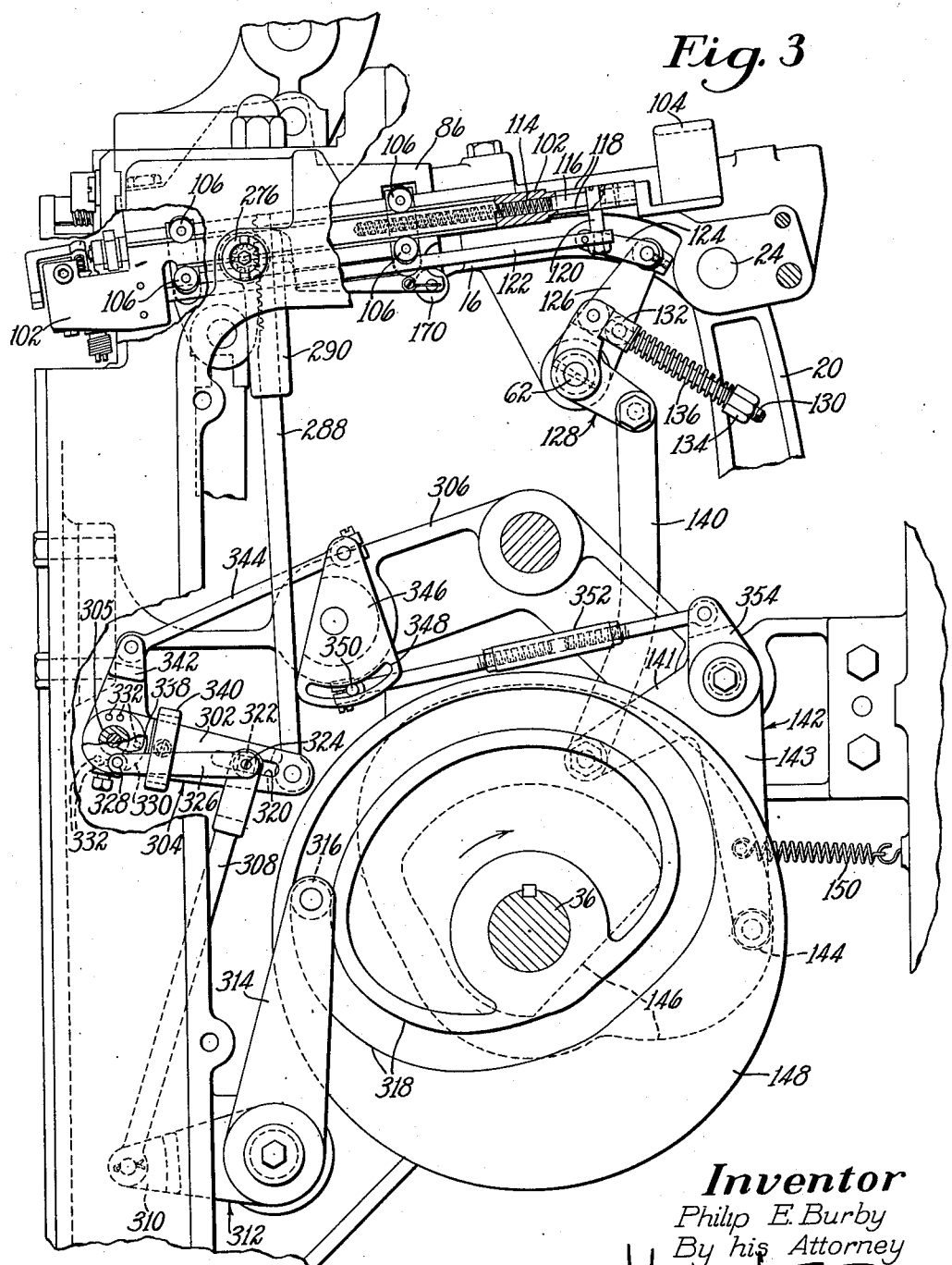
Fig. 3 is a view in right-hand side elevation of certain portions of the machine, with parts broken away.

For applying the wire binder about the toe end of the shoe to hold the upper in lasted position the machine herein shown is provided with a pair of grippers 98 (Figs. 7 and 8) supported as hereinafter described on blocks 100 secured on the front ends of bars 102 which are supported respectively for forward movements lengthwise of the shoe on the opposite sides of the wiper carrier 16 to cause the grippers to apply a pull to the binder. The two bars 102 are rigidly connected together at their rear ends by a cross bar 104 so that they will move in unison. To facilitate the movements of the bars 102, each bar is guided by two pairs of rolls 106 (see Fig. 3) engaging laterally inclined upper and lower faces on the bar as illustrated in Fig. 10, each pair of rolls being supported on a holder 108 secured by a screw 110 to the wiper carrier 16. Still further to facilitate the movement of each bar the head of each screw 110 has extending around it a ball bearing 112 consisting of an annular member 113 having therein recesses for a plurality of balls engaging the holder 108 and the inner face of the bar 102. It will be understood that by reason of the inclined upper and lower faces on each bar 102 it is confined by the rolls 106 against lateral outward movement.

The bars 102 are first moved yieldingly in a forward direction through springs 114 (Fig. 3) which are mounted therein and which are engaged at their rear ends by pins 116 slidingly movable in the bars. Extending upwardly into a slot 118 in each bar is a pin 120 engaging the rear end of the pin 116, the pin 120 being fast on the rear end of another forwardly and rearwardly movable bar 122 the purpose of which will be hereinafter explained. Each bar 122 is connected by a link 124 to an arm 126 loosely mounted to swing about the previously mentioned shaft 62 supported on the wiper carrier 16. The right-hand arm 126, as shown in Fig. 4, is thus mounted on the hub of a bell-crank lever 128 which is fast on the shaft 62, one arm of this bell-crank lever having pivotally connected thereto a rearwardly extending rod 130 mounted to slide in a block 132 which is pivotally mounted on the arm 126. Between the block 132 and a nut 134 on the rear end of the rod 130 is a spring 136. The arm 126 on the left-hand end of the shaft 62 is similarly connected through a corresponding spring to an arm 138 fast on that end of the shaft. When the bell-crank lever 128, therefore, is swung in a counterclockwise direction with reference to Fig. 3, this lever and the arm 138 on the left-hand end of the shaft act respectively through the springs 136 associated therewith to operate the arms 126 and thereby to impart forward movements through the pins 128 and the springs 114 to the bars 102. For thus operating the bell-crank lever 128 it is connected by a link 140 to one arm 141 of a three-armed lever 142 pivotally mounted on a bracket on the frame, another arm 143 of this lever being provided with a roll 144 lying in a cam track 146 formed in one side of a cam wheel 148 on the cam shaft 36. A spring 150 connected to the arm 143 tends to swing the three-armed lever 142 in a counterclockwise direction with reference to Fig. 3, the cam track 146 throughout the greater portion of its length being considerably wider than the roll for a purpose hereinafter explained. When the parts are in their initial positions a shoulder formed on an enlarged front end portion of each bar 102 is in engagement with the front face 152 (Fig. 9) of the foremost roll holder 108.

Each gripper 98 includes a bar 154 (Fig. 12) the inner end of which serves as one of the jaws of the gripper, and movably mounted in guideways formed in upstanding side portions of the bar is a slide 156 which serves as the other jaw of the gripper, the slide having teeth on its inner end for engaging the binder wire. Extending laterally through an insert 157 secured on the inner end of each bar 154 is an aperture 158 through which the wire is fed as hereinafter described into position to be gripped by the jaws, the insert and the bar having at the wire-receiving end of the aperture a tapering recess to guide the wire into the aperture. The wire is thus fed first through the aperture in the right-hand gripper from a nozzle member 160 (Fig. 8) secured on the right-hand block 100, and by means hereinafter described it is guided in a curved path to the left-hand gripper where it is fed through the aperture in that gripper. Each bar 154 is pivotally mounted at its outer end for swinging movements heightwise of the shoe on a pin 162 (Figs. 9 and 12) supported in upwardly extending side portions of a gripper carrier 164 mounted for movements in directions widthwise of the shoe on the corresponding block 100. To facilitate such movements of the gripper carrier there are provided ball bearings 166 (Fig. 9) consisting of ball cages 168 of angular shape each provided with recesses for two series of balls in engagement with bearing faces on the block 100 and the carrier 164. As will be evident from Fig. 9, these ball bearings are so arranged as to support the carrier 164 against any force acting thereon in an upward or a downward direction and in a forward or a rearward direction.

For moving the carriers 164 and the grippers thereon inwardly toward the shoe the previously mentioned bars 122 are utilized, these bars being operated, as hereinbefore described, by the same cam-operated mechanism (Fig. 3) which imparts forward movements to the bars 102 to move the grippers lengthwise of the shoe. Each bar 122 is guided in its forward and rearward movements by a roll 170 mounted on the wiper carrier 16 and also near its front end by a pair of rolls 172 (Figs. 9 and 12) rotatably mounted on pins in the bar 102. The rolls 172 extend into grooves in the upper and lower faces of the bar 122 (Fig. 12). Formed on each bar 122 are rack teeth 174 in engagement with a gear sector 176 (Fig. 13) mounted on a stud 178 which is secured to a plate 180 fast on the lower face of the block 100. Integral with the gear sector 176 is another gear sector 182 in engagement with a pinion 184 having a downwardly extending sleeve 186 (Fig. 12) rotatable in a bushing 188 in the plate 180. Mounted on the top of the pinion 184 is another pinion 190 having a stem 192 extending downwardly through the sleeve 186, the pinion 190 engaging rack teeth 194 formed on one side of the gripper carrier 164. Connected to the sleeve 186 on the lower pinion 184 and to the stem 192 of the upper pinion 190 is a torsion spring 196 through which the upper pinion is operated by the lower pinion, this spring being yieldable after the inner end of the gripper 98 has engaged the side of the shoe. Extending upwardly from the lower pinion 184 into an annular slot 198 in the upper pinion 190 is a pin 200, and fast in the pinion 190 is a pin 202 held normally against the pin 200 by the spring 196. After the gripper has engaged the shoe the pin 200 moves away from the pin 202 as the pinion 184 continues its movement. It will be evident that the grippers are thus moved inwardly toward the shoe by forward movements of the bars 122 relatively to the bars 102 in response to resistance of the shoe to forward movements of the grippers, the springs 114 yielding to permit such movements of the bars 122. The springs 114, which are comparatively light springs, yield to such an extent that the pins 120 engage the bars 102 at the front ends of the slots 118 in the bars prior to the completion of the operation of the grippers, after which the grippers are caused to apply greater force to the binder by the action of the pins 120 on the bars 102, the stronger springs 136 yielding at this time.

To facilitate upward and downward swinging movements of each gripper 98 about the pin 162 the rear face of the gripper bar 154 is engaged by a ball bearing 204 (Figs. 8 and 12) mounted in a recess in the gripper carrier 164, this ball bearing being of the same construction as the ball bearings 112 (Fig. 10) engaging each bar 102.

It is necessary that when the wire is fed the aperture 158 in the right-hand gripper shall aline properly with the passageway in the wire-guiding nozzle member 160 (Fig. 8) and with the means hereinafter described for guiding the wire from the right-hand gripper to the left-hand gripper, and also that the corresponding aperture in the left-hand gripper shall aline properly with the last-mentioned guiding means. For this purpose there is associated with each gripper a positioning finger 206 (Figs. 1, 8 and 12) which is secured on the front end of the wiper carrier 16 and has a tapered end portion arranged to extend into a slot 208 in the rear upwardly extending wall of the gripper carrier 164 and also to engage the upper face of the gripper bar 154, as illustrated in Fig. 12. When the parts of the machine, therefore, are in their initial positions the finger 206 associated with each gripper determines the position of the gripper carrier 164 with respect to inward and outward movements and determines the position of the gripper bar 154 with respect to movement about the pin 162. The gripper bar is thus held depressed against the resistance of a spring 210 which tends to swing it upwardly, this spring being seated in recesses in the gripper bar and the gripper carrier 164. When the grippers are moved forwardly by the bars 102 to apply the binder wire to the shoe they are carried away from the fingers 206, thus permitting them to be swung upwardly by the springs 210, the upward movement of each gripper being limited by the engagement of a pin 212 on the gripper bar with a shoulder 214 on the gripper carrier 164. In the return of the parts to starting positions the tapering ends of the fingers 206 cause them again to enter the slots 208 in the gripper carriers and to depress the gripper bars.

For closing each gripper on the wire there is pivotally mounted on the pin 162 a cam 216 (Fig. 12) in engagement with the outer end of the slide 156 which serves, as hereinbefore described, as one of the jaws of the gripper, the slide being held against the cam by a spring 218 connected thereto and to a pin 220 (Fig. 8) on the gripper bar 154. Initially, as shown in Fig. 12, the slide 156 is held retracted by the spring, a tail 222 on the cam being engaged by a stop member 224 fast on a bracket 226 which is secured on the front of the frame of the machine. In response to the upward swinging movement of the wiper carrier 16 to cause the wipers to wipe the upper heightwise of the last the tail 222 is carried into engagement with a forwardly and rearwardly extending portion 228 (Fig. 7) of a member 230 which is pivotally mounted on the bracket 226 for upward swinging movement against the resistance of a spring 232. By the action of the member 230 on the tail 222 the cam 216 is turned about the pin 162 to force the slide 156 inwardly and thus to cause the gripper to grip the binder wire. It will be understood that the spring 232 permits the member 230 to swing upwardly in response to further upward movement of the wiper carrier 16 after the gripper has gripped the wire. The initial position of the member is determined by engagement of a boss 234 (Fig. 1) thereon with an upper face of the bracket 226.

In response also to the upward movement of the wiper carrier 16 the portion of the wire which is to serve as a binder is severed from the rest of the wire by a cutter 236 (Fig. 8) which serves as a shearing member in engagement with the rear face of the nozzle member 160. This cutter is a part of a lever 238 a cylindrical portion 240 of which is rotatably mounted in a socket formed in the nozzle member 160. A spring 242 mounted in the cylindrical portion 240 and confined by the head of a screw 244 which is threaded in the member 160 tends to move the lever 238 bodily in a forward direction and thereby holds the cutter 236 yieldingly against the rear face of the member 160. Another spring 246 mounted between one arm of the lever 238 and the block 100 holds the lever initially with the cutter 236 below the end of the wire-guiding passage in the member 160, this position of the lever being determined by engagement of the cutter with a corner of the block 100. In response to the upward movement of the wiper carrier 16 the right-hand end portion of the lever 238 is engaged by a bracket 248 which is fast on the bracket 226, in consequence of which the lever is operated to move the cutter 236 upwardly to cut the wire.

The supply of binder wire $w$ is supported on a reel 250 (Figs. 7 and 15) rotatably mounted on a bracket 252 which is fast on the right-hand side of the frame, the reel being prevented from turning too freely by friction means which need not be herein described. The wire from the reel passes over a pulley 254 rotatably mounted on a lever 256 which is pivotally mounted between its opposite ends on an arm 258 secured to the bracket 252. A spring 260 connected to the lever 256 tends to swing the pulley 254 in the direction to hold the wire taut between the reel and the wire-feeding means. Secured to the lever 256 is an angular bracket 262 on which are mounted two pieces of felt 264 extending into a V-shaped groove in the pulley 254 to insure against displacement of the wire. From the pulley the wire passes between two feed wheels 266 and 268 which are connected together by a gear wheel 269 concentric with the feed wheel 266 and a gear wheel 270 concentric with the feed wheel 268. The gear wheel 269 is fast on a shaft 272 mounted in a bearing in the bracket 252. On the inner end of this shaft is a coupling member 274 interlocking with a complemental coupling member 276 secured on the right-hand end of a shaft 278 the left-hand end of which is mounted in a bearing in the frame. This shaft extends through a clutch member 280 having a hub portion 282 mounted in a bearing in the frame and in fixed relation to the coupling member 276. Loosely mounted on the shaft 278 is another clutch member 284 having a hub portion on which is formed a pinion 286 in engagement with the teeth of an upwardly and downwardly extending rack bar 288 movable in a guide member 290 which is free to turn about the shaft 278. The guide member is held against movement lengthwise of the shaft by a rod 292 (Fig. 4) lying between downwardly extending ears 294 on the guide member. At its left-hand end the pinion 286 is engaged by a collar 296 loose on the shaft 278, and a spring 298 confined between this collar and a portion of the frame tends to move the clutch member 284 toward the right with reference to Fig. 7 and thus holds it in engagement with the clutch member 280. The opposed faces of these clutch members have ratchet teeth thereon which provide a driving connection between the member 284 and the member 280 when the rack bar 288 is moved upwardly to feed the wire. When the rack bar is moved downwardly the spring 298 yields and the clutch member 284 slips relatively to the clutch member 280. To prevent reverse movement of the clutch member 280 the wire is engaged frictionally by a brake member 299 (Fig. 15) which is one arm of a bell-crank lever pivotally mounted on the bracket 252 and controlled by a spring 300. From the feed wheels 266 and 268 the wire is guided by a flexible tube 301 to the nozzle member 160 (Fig. 8).

The rack bar 288 is pivotally connected at its lower end (Fig. 3) to one arm 302 of a bell-crank lever 304 pivotally mounted on a stud 305 supported in a spider 306 secured to the frame, and the arm 302 is connected by a link 308 to one arm 310 of a bell-crank lever 312 the other arm 314 of which is provided with a roll 316 lying in a cam track 318 in the previously mentioned cam wheel 148. Through the connections described, therefore, the cam track 318 acts at the proper time to feed the wire by swinging the bell-crank lever 304 in a counterclockwise direction with reference to Fig. 3. In order to provide binders of different lengths in operating on shoes of different sizes the link 308 is adjustable relatively to the arm 302 to vary the throw of the arm and therefore the extent of its wire-feeding movement. For this purpose the arm has therein a slot 320 along which is slidingly movable a block 322 mounted on a pin 324 which extends through the slot between the opposite side portions of a forked upper end of the link 308. To adjust the link relatively to the arm there is pivotally mounted at one end on the pin 324 a link 326 the other end of which is connected by a pin 328 to a disk 330 adjacent to the hub of the bell-crank lever 304. As shown in Fig. 4, the inner end of the pin 328 is reduced in diameter, and is arranged to enter one or another of a plurality of holes 332 in the hub of the bell-crank lever. Secured to the disk 330 in concentric relation thereto is a rod 334 on the outer end of which is a knob 336 by which the disk may be moved toward the right with reference to Fig. 4 to withdraw the inner end of the pin 328 from one of the holes 332 and may then be turned to bring the pin into registration with another one of the holes, thereby adjusting the link 308 along the arm 302. Extending from the disk 330 into a hole in the stud 305 is a pilot pin 338 to guide the disk in its adjusting movements. When the disk is moved outwardly or inwardly by the rod 334 the pin 328 slides outwardly or inwardly in the hole in the link 326 through which it extends. To prevent lateral movement of the link 326 it extends through a slot in a guide 340 fast on the arm 302.

When the wire-feeding mechanism is adjusted in the manner above described to vary the length of the binder for shoes of different sizes the increase or decrease in the length of the binder should be equal at the opposite sides of the shoe. Provision is therefore afforded for correspondingly varying the positions of the grippers 98 lengthwise of the shoe before they grip the wire. For this purpose the bell-crank lever 304 has an upwardly extending arm 342 connected by a link 344 to the upper end of a lever 346 pivotally mounted between its upper and lower ends on the spider 306. In its lower end the lever 346 has a slot 348 into which extends a pin 350 on the front end of a forwardly and rearwardly extending link 352. This link is connected at its rear end to a third arm 354 of the previously mentioned three-armed lever 142 through which the bars 102 are operated to move the grippers forwardly lengthwise of the shoe. In response to the wire-feeding movement of the bell-crank lever 304 the lever 346 is swung in a counterclockwise direction with reference to Fig. 3 relatively to the pin 350 until the pin is engaged by the lever at the left-hand end of the slot 348. When the adjustment of the link 308 is such as to cause the wire-feeding mechanism to feed the shortest length of wire required, the block 322 being located then near the right-hand end of the slot 320 with reference to Fig. 3, the lever 346 is moved only so far that the pin 350 is positioned at the left-hand end of the slot 348 without any action of the lever on the link 352. When the adjustment, however, is such as to feed any greater length of wire, the lever 346, near the end of the wire-feeding operation, imparts a certain amount of rearward movement to the link 352 and thereby swings the three-armed lever 142 in a clockwise direction, carrying the roll 144 somewhat away from the outer wall of the cam track 146. The result of this movement of the three-armed lever is that the bars 102 are moved a short distance forwardly to impart corresponding forward movements to the grippers 98 before they grip the wire. It will be understood that the amount of forward movement which the grippers thus receive before they grip the wire is not sufficient to release them from the control of the positioning fingers 206.

To direct the wire in its feeding movement from the right-hand gripper 98 to the left-hand gripper there is provided a curved guide member 356 (Figs. 6, 8, 11 and 14) secured by screws 358 to the wiper carrier 16 below the wipers and having therein a guideway 360 for the wire. Initially this guideway is closed on the side toward the shoe by a similarly curved member 362 having a pair of rearwardly extending ears 364 (Fig. 14a) pivotally mounted on a pin 366 supported in rearwardly extending ears 368 on the guide member 356. The member 362, therefore, may swing upwardly and downwardly about the pin 366. Initially it is held in position to close the guideway 360 by a pair of spring-pressed pins 370 engaging its rear face and mounted in the wiper carrier 16. Upward movement of the member 362 under the influence of the spring-pressed pins 370 is limited by engagement of a flange 372 thereon (Fig. 11) with the member 356. To cause the member 362 to uncover the guideway 360 after the feeding of the wire and thus to permit the grippers 98 to withdraw the wire from the guideway and apply it to the shoe, there is pivotally connected to it a rod 374 which extends downwardly through a transverse bore in a pin 376 (Fig. 6) mounted for turning movement in a forked bracket 378 fast on the frame. On the lower end of the rod 374 is secured a collar 380 which, in response to upward swinging movement of the wiper carrier 16 near the end of that movement, engages the pin 376 and thus causes the member 362 to uncover the guideway 360 as the wiper carrier completes its upward movement. Premature displacement of the wire from the guideway is, however, still prevented by a member 382 (Fig. 14) which extends upwardly and forwardly in front of the guideway in a location opposite to the extreme end of the toe of the shoe. This member extends upwardly into substantially contiguous relation to the lower faces of the wipers and when the wire is pulled forwardly by the grippers 98 guides it into contact with the wipers. A rearwardly extending portion of the member 382 is pivotally mounted on the pin 366 between the ears 364 (Fig. 14a) and is supported on a substantially U-shaped spring clip 384 end portions of which extend outwardly over the ears 364 and 368. This spring clip permits a slight yield of the front portion of the member 382 in a downward direction as the wire is pulled forwardly by the grippers.

For fastening the binder to the shoe the machine is provided with a pair of fastening-inserting mechanisms 386 (Fig. 1) which may be termed stapling units, each unit including means for forming a staple and for inserting or driving it in a direction widthwise of the shoe through the upstanding margin of the upper and the lip of the insole in position to straddle the wire binder forwardly of the wipers while the binder is held against the margin of the upper by the wipers. These units are in many respects like corresponding units shown in Letters Patent No. 2,420,684 which may be referred to for a better understanding of some details, especially with reference to the staple-forming means. Each unit includes a main bar 388 (Fig. 16) arranged to extend generally widthwise of the shoe, this bar in the construction herein shown being pivotally mounted at its outer end for swinging movements heightwise of the shoe about a stud 390 in the lower end of a link 392 which is pivotally mounted at its upper end to swing widthwise of the shoe on a casting 394. By downward swinging movement of the bar 388 a staple-clinching anvil 396 fast on its inner end is carried into engagement with the insole in a location somewhat farther inward than the lip of the insole, and by outward swinging movement of the link 392 the anvil is moved into engagement with the inner face of the lip for supporting the lip and clinching the legs of the staple, as more particularly hereinafter described. Pivotally connected to the bar 388 near its inner end is an upwardly extending link 398 provided at its upper end with a slot 400 through which extends a headed stud 402 threaded in the casting 394. Near its lower end the link is confined against forward or rearward movement by a bifurcated lower end portion of a bracket 404 fast on the casting 394. The link 398 accordingly assists in guiding the stapling unit 386 in its movements. The stud 402 limits upward swinging movement of the unit and, if there is no shoe in the machine, also limits its downward swinging movement.

Each stapling unit 386 is supported as above described on a separate casting 394 adjustable independently in directions widthwise of the shoe on a casting 406 which supports both castings 394. As illustrated in Fig. 20, each casting 394 is guided in its adjusting movements by upper and lower flanges 408 and 410 on the casting 406, and formed on the lower flange 410 are rack teeth 412 (Fig. 16) engaged by a pinion 414 formed on a shaft 416 rotatable in the casting 394. Secured on the front end of this shaft is a hand wheel 418 for turning it. Mounted on the shaft between a hub on the hand wheel and the casting 394 is a split clamp 420 which is prevented from turning by a pin 422 (Fig. 19) extending therefrom into a hole in the casting 394. The clamp may be contracted by a screw 424 threaded therein to apply more or less friction to the shaft 416 and thereby to hold the casting 394 and the stapling unit supported thereon in any position of adjustment widthwise of the shoe. A stop member 426 on the casting 406 is arranged to engage the casting 394 to limit movement of the latter in an outward direction.

Figure 19:
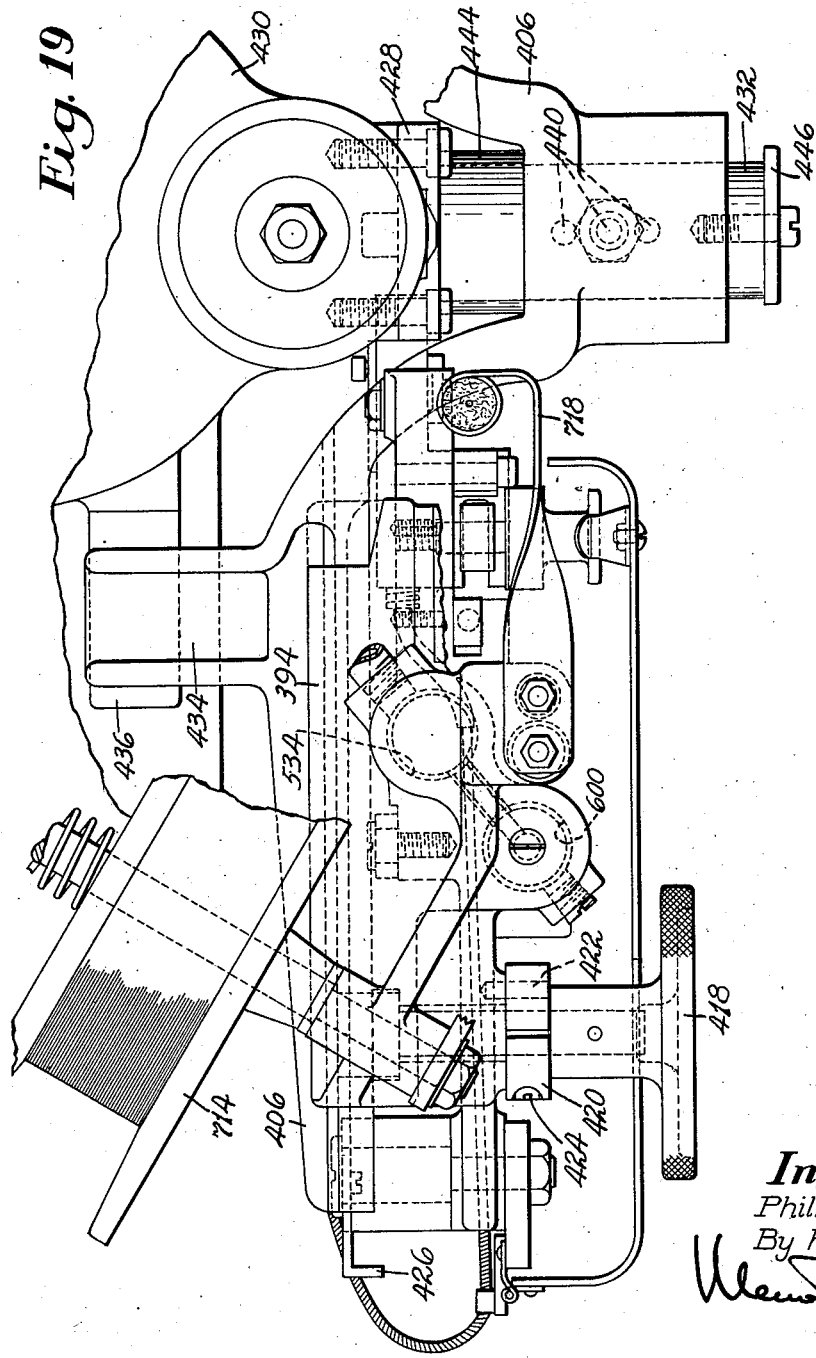
Fig. 19 is a plan view of the structure shown in Fig. 16.

The casting 406 which supports the two castings 394 is itself supported centrally widthwise of the machine by a bracket 428 secured on the front of a head casting 430 mounted on the frame of the machine, the bracket having a cylindrical portion 432 extending forwardly into a bore in the casting 406. To prevent the casting 406 from turning about the cylindrical portion of the bracket 428 it is provided with two rearwardly extending lugs 434 arranged to overlie and engage the top faces of lugs 436 on the head casting 430. One of the lugs 434 and the lug 436 engaged thereby in the left-hand portion of the machine are shown in Fig. 19, and it will be understood that there are similar lugs in the right-hand portion. Supported as above described, the casting 406 may be adjusted forwardly or rearwardly to vary the positions of the stapling units lengthwise of the shoe. To retain the casting in adjusted position it has mounted therein a spring-pressed pin 438 (Fig. 1) arranged to enter any one of three holes 440 (Fig. 19) in the cylindrical portion 432 of the bracket 428. By means of a knob 442 on its lower end the pin may be withdrawn from any of the holes to permit the adjustment. In operating on men's shoes adjustment is usually required only for two different ranges of sizes, and accordingly the pin 438 will be located only in the middle hole 440 or in the hole in front thereof. To facilitate the adjustment there is loosely mounted on the cylindrical portion 432 of the bracket 428 between the rear portion of the bracket and the casting 406 a spacing collar 444 which determines the position of the casting when the pin 438 is in alinement with the middle hole 440. If the machine is to operate on women's shoes, which usually require adjustment only for two ranges of sizes, there will be provided a shorter collar 444 which will determine that position of the casting 406 in which the pin 438 is in alinement with the rearmost hole 440. From that position the casting will be moved forwardly when required to aline the pin with the middle hole. A cap 446 secured on the front end of the cylindrical portion 432 of the bracket 428 prevents accidental excessive forward movement of the casting 406.

Mounted in a guideway in the bar 388 of each stapling unit 386 for movements in directions toward and from the shoe is a slide 448 (Fig. 22) one portion 450 of which serves as an outside former to form a staple over an inside former 452 (Fig. 24). The inside former extends inwardly through a slot in the slide 448 and is movable in directions transverse to the directions of movement of the slide in an opening formed in the bar 388 and in a member 454 secured on one side of the bar. In response to movement of the slide 448 inwardly toward the shoe the staple is thus formed from wire fed as hereinafter described through a nipple 456 mounted in an opening in the bar 388 into position between the outside former 450 and a reduced inner end portion of the inside former 452. The outside former has fast thereon a cutter 458 which serves as a shearing member in engagement with the inner end of the nipple 456 to sever from the wire a portion of the proper length to form the staple as the slide 448 begins its inward movement. After the forming of the staple the inside former 452 is forced outwardly against the resistance of a spring 460 by engagement of a deflecting surface 462 (Fig. 26) on the slide 448 with a curved surface 464 on the former to provide a clear path for a staple driver 466 movable in a guideway in the outside former 450. Mounted in a recess in the slide 448 in a location opposite to the inside former 452 when the parts are in their initial positions is a block 468, this block being provided with a slot 470 into which the staple-forming portion of the inside former extends. A pair of springs 472, one of which is shown in Fig. 26, positioned between the block 468 and the slide 448 tend to move the block in an outward direction and hold it against a member 474 detachably confined in an opening in a plate 476 fast on one side of the bar 388. With the block in its initial position a space is provided between it and the slide 448 to receive the wire from which the staple is to be formed and to permit the bending of the wire about the inside former. Immediately after the forming of the staple the block 468, which moves with the slide 448, is forced inwardly against the resistance of the spring 472 by a deflecting face (not shown) on the plate 476 to close the space between the block and the slide 448 and thus to assist in guiding the formed staple, the block being provided with a guideway for the staple and the driver arranged to aline with the driver guideway in the outside former 450. The parts thus cooperating to form and to guide the staple are constructed substantially as disclosed in Letters Patent No. 2,420,684, the block 468 corresponding to the block 346 shown in said Letters Patent. The outside former 450, however, in the construction herein shown, is formed as an integral part of the slide 448. Also formed as an integral part of this slide is a throat member 478 provided with a guideway 480 for the staple and the driver beyond the block 468, the block being located in a recess between this throat member and the outside former.

In the construction herein shown the throat member 478 of each stapling unit, when it is moved inwardly toward the shoe, does not actually engage the shoe, but has associated with it a pair of fingers 482 and 484 (Fig. 22) arranged to extend inwardly beyond it and positioned one above the other. An important function of these fingers is to position between them the portion of the binder which is to be engaged by the staples and to locate that portion of the binder heightwise of the shoe in exactly the right relation to the staple-guiding passage 480 in the throat member 478 to cause it to be straddled by the staple when the latter is driven. Extending upwardly from the lower finger 484 at a short distance from its extreme inner end are two lugs 485 located at opposite sides respectively of the corresponding portion of the upper finger 482, these lugs being arranged to engage the binder held taut by the grippers 98 and to press it inwardly toward the upper. The fingers 482 and 484 lie in a recess in one side of the bar 388, as shown in Fig. 24, and they are pivotally connected together near their outer ends by a pin 486 for swinging movements toward and from each other heightwise of the shoe. Extending from the lower finger 484 into a guiding slot 488 in the slide 448 is a pin 490, this pin-and-slot connection permitting the slide to move farther inward relatively to the fingers when the inward movements of the fingers are retarded by engagement of the lugs 485 with the binder. Initially the fingers are positioned relatively to the slide 448 as shown in Fig. 22 by a compression spring 492 engaging the rear end portion of the finger 484 in a slot formed in the finger and seated at its rear end in a recess formed in a block 494 on the slide 448. In response to inward movement of the slide 448 relatively to the fingers their inner end portions, which are initially spaced substantial distances apart as shown in Fig. 22, are caused to swing equal distances toward each other to position the binder as above described. For this purpose the throat member 478 has projecting laterally therefrom pins 496 which lie in cam slots 498 in the fingers. Formed in the inner end portions of the fingers are guideways 500 which, when the fingers are thus closed on the binder, aline with the guideway 480 in the throat member 478. After the fingers have thus been closed on the binder they are moved farther inwardly into engagement with the upper by positive engagement of the throat member 478 with shoulders 504 on the fingers. The fingers by their engagement with the upper thus determine the limit of the inward movement of the throat member. It will be understood that the fingers by their final inward movements position the portion of the binder which is to receive the staple close to the upstanding margin of the upper.

Movement toward the shoe is imparted to each slide 448 through a toggle 506 (Fig. 16) comprising a pair of toggle links 508 and 510 pivotally connected together by a stud 512, the link 508 being pivotally mounted on a cylindrical boss 514 (Fig. 23) on the slide 448 and being held on the boss by a screw 515 threaded in the boss. The link 510 is pivotally connected at its outer end by a stud 516 to a slide 518 movable along a guideway in the bar 388, this slide carrying a pin 520 which extends upwardly into a slot 522 in the bar and engages another pin 524 movable in an outward direction in the bar against the resistance of a pair of springs 526 and 528. After the inward movement of the slide 448 has been stopped by the engagement of the fingers 482 and 484 with the shoe and the engagement of the throat member 478 with the shoulders 504 on the fingers, the slide 518 is moved a short distance in an outward direction against the resistance of the springs 526 and 528 by further straightening of the toggle 506. To permit this movement of the slide 518 the stud 515 is positioned in a slot 530 at the outer end of the bar 388. The straightening of the toggle 506 is limited by means hereinafter described.

The toggle 506 of each stapling unit is operated by fluid-pressure means comprising a piston 532 vertically movable in a cylinder 534 formed in the casting 394, this cylinder having fast therein a lining 536 engaged by the piston. The piston is connected by a link 538 to an ear 540 on the toggle link 508, the link lying in a slot 542 in the piston as shown in Fig. 21. When operating fluid, preferably light oil, is forced into the upper end of the cylinder, as hereinafter described, the piston 532 is moved downwardly against the resistance of a return spring 544 (Fig. 1) connected at its upper end to a hook 546 on the casting 394 and at its lower end to a pin 548 (Fig. 21) mounted in a member 550 which is formed on the lower end of the piston. As the piston starts to move downwardly the cutter 458 (Fig. 22) engages the wire extending downwardly from the nipple 456 and the resistance of the wire to the straightening of the toggle temporarily prevents movements of the slide 448 inwardly toward the shoe. The piston, therefore, first causes the bar 388 and the parts thereon to swing downwardly about the stud 390 at the outer end of the bar against yielding resistance of means hereinafter described until the anvil 396 engages the bottom of the insole in a location somewhat farther inward than the lip of the insole. By reason of the resistance of the shoe to further downward movement of the bar the toggle is then straightened to cause the cutting of the wire, the forming of the staple and the movements of the staple-guiding parts to the positions determined by the shoe, as hereinabove described.

After the anvil 396 of each stapling unit has been moved downwardly into engagement with the insole as above described, it is moved in an outward direction to seat it against the inner face of the lip of the insole in response to continued downward movement of the piston 532. For this purpose there is provided a link 552 pivotally mounted at its upper end on a stud 554 on the casting 394 for swinging movements widthwise of the machine, the link being pivotally connected at its lower end to a rod 556 extending outwardly through an eye-bolt 558 mounted to turn in the link 392 on the lower end of which is pivotally supported the outer end of the bar 388. A nut 560 threaded on the outer end of the rod 556 engages one side of the eye-bolt, and between the other side thereof and an enlarged head on the rod 556 is a compression spring 562. Mounted on the member 550 (Fig. 21) which moves downwardly with the piston 532 is a roll 564 which lies in a cam slot 566 in the link 552. As the roll moves downwardly along this cam slot it swings the link 552, which may be termed a cam member, in an outward direction and thereby swings the link 392 in the same direction to move the bar 388 outwardly until the anvil 396 engages the lip of the insole, after which the spring 562 yields in response to such further swinging movement as the link 552 receives from the roll 564.

It will be evident that after the cutter 458 cuts the wire the component of force applied through the toggle 506 and tending to hold the anvil 396 down on the insole is substantially reduced. To afford better insurance that the anvil will still be held firmly down on the insole a pin 568 (Figs. 16, 22 and 23) which connects the lower end of the previously mentioned link 398 to the bar 388 has loosely mounted thereon an arm 570 extending downwardly in an outwardly inclined direction, and mounted on a hub 572 formed on this arm is a torsion spring 574 one end of which is in engagement with a pin 576 on the bar 388 and the other end of which is hooked partly around the arm and holds the arm initially in contact with the pin. Mounted on the toggle link 508 is a roll 578 which engages the arm 570 immediately after the wire is cut and during the further straightening of the toggle swings the arm against the resistance of the spring 574. Additional force tending to hold the anvil down on the insole is therefore applied to the bar 388 through the arm 570 and the spring 574.

Each staple driver 466 is carried by a slide 580 movable in a guideway in the bar 388 (Figs. 22 and 25). Extending through a bore in the slide is a bolt 582 through a hole in which the driver extends, this hole alining with a hole in the slide. Mounted on the bolt is a bushing 584 through which the driver is clamped to the slide by a nut 586 threaded on the bolt, a washer 588 being provided between the nut and the bushing. Mounted to turn on the bushing is one link 590 of a toggle 592 through which the driver is operated, the other link 594 of the toggle being pivotally connected to the link 590 by a stud 596 and being pivotally mounted at its outer end on the previously mentioned stud 516 in the slide 518. The toggle 592 is operated by fluid-pressure means comprising a piston 598 movable in a cylinder 600 formed in the casting 394 and engaging a lining 602 fixed in the cylinder. The piston is connected by a link 604 to an ear 606 formed on the link 590, the link 604 lying in a slot 608 (Fig. 21) in the piston. When the operating fluid is forced into the upper end of the cylinder 600 the piston 598 is moved downwardly against the resistance of a return spring 610 (Fig. 1) connected at its upper end to a hook 612 on the casting 394 and at its lower end to a pin 614 (Fig. 21) mounted in a member 616 which is formed on the lower end of the piston.

Operating fluid is admitted to the cylinder 600 from the cylinder 534 through a port 618 extending through a portion of the casting 394 and through the two linings 536 and 602 in the cylinders. It is necessary, however, to prevent operative movement of the driver-operating toggle 592 until the toggle 506 has substantially completed its movement to form the staple and to operate the throat member 478. There is, therefore, pivotally mounted on the bar 388 by means of a stud 620 (Fig. 16) an arm 622. A spring 624 extending around the stud 620 tends to swing this arm upwardly and holds it initially in a position determined by engagement of a pin 626 thereon with the lower face of the bar 388. Also mounted on the arm is a pin 628 which normally lies in a recess formed in an outward extension 630 of the driver-operating slide 580 to cause the arm 622 to prevent movement of the slide by the toggle 592. When the toggle 506 has substantially completed its movement its link 510 engages the arm 622 and swings it downwardly to cause the pin 628 to release the slide 580, thus permitting the operative movement of the staple driver. When the slide is returned a deflecting face on the extension 630 engages the pin 628 and swings the arm downwardly to cause the pin again to enter the recess in the extension. The straightening of the toggle 506 is limited by engagement of the pin 628 on the arm 622 with a guide face on the bar 388 along which the slide 580 moves.

The piston 598 is not subjected to the full force of the operating fluid when the fluid is first admitted to the cylinder 534, since the spring 610 is depended upon to offer enough resistance to the downward swinging movement of the bar 388 by the piston 532 to cause the cutter 458 first to engage the staple-forming wire as hereinbefore described. The downward movement of the piston 532, however, results in a slight downward movement of the piston 598 by reason of a downward pull of the toggle link 590 thereon. To facilitate such downward movement of the piston 598 without subjecting it to the full force of the operating fluid, there is secured to the upper end of the piston 532 a thin sleeve 632 spaced only slightly from the lining 536 and extending initially upward a considerable distance beyond the port 618. Similarly there is secured to the upper end of the piston 598 a thin sleeve 634 spaced slightly from the lining 602 and extending upwardly only as far as the upper edge of the port 618. These sleeves permit a seepage of the fluid from the cylinder 534 into the cylinder 600 to compensate for the above-mentioned slight downward movement of the piston 598 and thereafter to build up pressure in the cylinder 600 before the port 618 is uncovered by the sleeve 632 substantially at the end of the downward movement of the piston 532. To permit a quick exhaust of the fluid from the cylinder 600 during return movement of the pistons, a port 636 in the upper end of the cylinder is arranged to communicate through a passageway 638 with the upper end of the cylinder 534. Admission of fluid from the cylinder 534 to the cylinder 600 through the port 636 is prevented by a ball check valve 640. It will be understood that by reason of pressure of the fluid on this valve from above it is closed at all times except when the fluid is released from the cylinder 534.

It has already been explained that after the inward movement of the slide 448 (Fig. 22) has been stopped by engagement of the fingers 482 and 484 with the upper and engagement of the throat member 478 with the shoulders 504 on the fingers, the slide 518 (Fig. 16) is moved a short distance outwardly against the resistance of the springs 526 and 528 by further straightening movement of the toggle 506. The slide 518, therefore, assumes a position depending upon the positions of the fingers 482 and 484 which are at this time engaging the upstanding margin of the upper lying against the lip of the insole in a location opposite to the anvil 396. Since the link 594 of the driver-operating toggle 592 is also connected to the slide 518 by the stud 516, it will be evident that this toggle is adjusted by the slide to determine the limit of the operative movement of the driver 466 in accordance with the positions of the fingers 482 and 484 from which the staple is driven by the driver, the movement of the driver-operating toggle being limited by engagement of its link 594 with a stop 642 formed on the bar 388. The means for thus determining the limit of movement of the driver through the action of the slide 518 will be recognized as of the same general character as means provided for the same purpose in accordance with the disclosure of Letters Patent No. 2,420,684.

To cause the grippers 98 to open and release the binder as the staples are driven to fasten it to the shoe, there is slidingly mounted on the link 590 of each driver-operating toggle a block 644 on which is formed a downwardly extending finger 646. As the driver is moved inwardly toward the shoe this finger is arranged to engage a lug 648 (Fig. 12) extending upwardly from the jaw-closing cam 216 of the corresponding gripper and to turn the cam into position to cause the gripper jaw slide 156 to be retracted by its spring 218. Slidingly mounted in the block 644 is a plunger 650 pressed upwardly by a spring 652 and in engagement at its upper end with a shoulder 654 on the link 590. By this means the block is normally held against a shoulder 656 on the lower end of the link. After the opening of the gripper the finger 646 remains in engagement with the lug 648 and the link 590 moves relatively to the block 644 against the resistance of the spring 652 until the toggle 592 completes its movement.

To insure that the fingers 482 and 484 (Fig. 22) will position and control in the manner hereinbefore described the portions of the binder which are to be engaged by the staples, there is associated with each of the stapling units 389 a device 658, which may be termed a binder-spreading device, arranged to engage a portion of the binder located between the fingers and the corresponding gripper 98 and to space that portion of the binder from the shoe before the fingers are moved inwardly toward the shoe. This device is made of resilient wire an upper curved end portion of which is secured to the bar 388 by a screw 660 which also secures the anvil 396 to the bar. The lower portion of the device is substantially V-shaped, comprising divergent arms 662 and 664, the arm 662 being arranged to engage the shoe upper and the arm 664 to engage the binder. Initially, as shown in Fig. 1, the lower ends of the V-shaped portions of the two devices 658 are in such relation to the shoe-positioning plate 2 that when the shoe is presented to the machine they will engage adjacent to the edge of the shoe bottom, portions of the upper already lasted and located just beyond the unlasted toe portion in a heelward direction. When the stapling units are swung downwardly to bring the anvils 396 into engagement with the insole the V-shaped portions of the devices are moved downwardly between the shoe and portions of the binder which are at that time held taut by the grippers 98 while being somewhat contracted by the pressure of the binder thereon. Insurance is thus afforded that the portions of the binder which are to be engaged by the staples will be positioned far enough outwardly from the shoe to be properly positioned heightwise of the shoe by the fingers 482 and 484 in the manner hereinbefore described and to be carried inwardly toward the upper by the fingers. When the stapling units are moved in outward directions after their downward movements to seat the anvil members 396 against the lip of the insole, the resilient wire of which the devices 658 are formed, because of the resistance of the binder, springs somewhat in locations adjacent to the screws 660.

Welded at 666 (Fig. 22) to each of the devices 658 is a member 668 made of thinner and more flexible resilient wire and having a hook-shaped lower end portion 670. Near the end of the downward swinging movement of the stapling unit the binder in contact with the arm 664 of the device 658 engages the hooked end 670 of the member 668 and deflects it in an outward direction until the binder assumes a position just above it (see Fig. 34). Accordingly, after the gripper 98 has released the binder and after the driving of the staple the return movement of the stapling unit in an upward direction causes the hooked end 670 of the member 668 to bend upwardly the free end portion of the binder extending beyond the staple. This insures against any possible reengagement of the gripper 98 with the end of the binder in its return to starting position with possible danger of detachment of the binder from the shoe. The upward bending of the free end portion of the binder also affords additional insurance that the staple will hold the binder effectively against slippage.

As hereinbefore explained, in the machine to which the invention is herein shown as applied the wipers 10, after having wiped the marginal portion of the upper inwardly over the feather and against the lip of the insole, are partially retracted lengthwise and widthwise of the shoe and are also raised slightly to relieve their downward pressure on the upper, after which they are again moved inwardly and are forced downwardly to apply the final pressure to the upper. It is at the time when the wipers are thus partially retracted and raised that the binder, through the force applied thereto by the grippers 98, is pulled fully inward under the wipers and against the upstanding margin of the upper. To insure that the binder at the sides of the toe near the ends of the wipers will not, because of the partial retractive movements of the wipers, assume too high a position against the upstanding margin of the upper, the machine is provided with members 672 (Figs. 1 and 16) which may be termed holddowns for the binder, these members having convexly curved faces 674 arranged to engage the binder adjacent to the forward ends of the wipers and to assist in guiding it to its proper position over the feather of the insole while preventing it from rising unduly regardless of the partial retractive movements of the wipers (see Fig. 32). The members 672 are supported by horizontally extended portions 676 (Fig. 16) of the previously mentioned brackets 404 which are secured to the castings 394. In this portion of each bracket is a horizontal slot 678 in which is slidingly mounted for movements in directions widthwise of the shoe a block 680, and on the front of this block is secured by a screw 682 a plate 684. This plate has therein a vertical slot 686 (Fig. 17) in which is slidingly mounted for upward and downward movements an upwardly extending portion of the holddown member 672, this portion of the member having a vertical slot 688 therein through which the screw 682 extends. The member 672 is thus adjustably movable upwardly or downwardly in the slot 686. To determine its proper position heightwise of the shoe there is secured to it by a screw 690, extending through the slot 688 with its head overlapping the member 672, a block 692 having therein a curved slot 694 through which extends a rod 696. This rod extends laterally from a block 698 (Fig. 1) in which are secured the previously mentioned pins 4 for engaging the insole and positioning the shoe heightwise in the machine, this block corresponding to the block 10 shown in the previously mentioned Letters Patent No. 2,385,414 and being adjustable about an axis extending widthwise of the shoe as disclosed in said Letters Patent. The block 698 is, moreover, vertically adjustable through means not herein shown in detail by a hand wheel 700 which corresponds to the hand wheel 30 shown in Letters Patent No. 2,160,846. It will thus be seen that through the action of the rod 696 on the block 692 associated with each holddown member 672 the member assumes a position depending upon the adjusted position of the block 698 and the pins 4, so that its lower end will be in the proper position heightwise relatively to the shoe to control the binder in the manner above described.

In order not to interfere with the presentation of the shoe to the machine the members 672 occupy initially retracted positions widthwise of the shoe, for which purpose the blocks 680 are slidingly movable in the slots 678. Secured in each block by a setscrew 702 (Fig. 18) is one end of a flexible wire cable 704 which extends first outwardly widthwise of the machine and thereafter inwardly and downwardly (Fig. 1) through a flexible guide 706 one end of which is secured in a nipple 708 (Fig. 16) threaded in the bracket 404. The other end of the wire cable, projecting from the flexible guide 706, is attached to the cover plate 86 on top of the wiper carrier 46. An intermediate portion of the flexible guide is fastened to an arm 710 which is secured to the casting 394. Between the nipple 708 and the block 680 is a compression spring 712 which tends to move the block in an inward direction to carry the holddown member 672 toward the shoe. When the wiper carrier 46 is in its initial position it acts through the two wire cables 704 to hold the blocks 680 in outwardly retracted positions against the resistance of the springs 712. When the wiper carrier is swung upwardly to cause the wipers to wipe the upper heightwise of the last its action on the cables is such as to permit the springs 712 to move the holddown members 672 inwardly toward the shoe until they are in proper relation to the shoe to control the binder in the manner described, their lower ends engaging the upstanding margin of the upper lying against the lip of the insole (Fig. 32). The lower portions of the holddown members are resiliently flexible to permit them to yield lengthwise of the shoe in case they are engaged by the forward ends of the wipers.

The wire W from which the staples are formed is supplied from a pair of reels 714 (Fig. 1) rotatably mounted respectively on the different castings 394 and passes over idler pulleys 716 and downwardly through guides 718 into the nipples 456 (Fig. 16) of the respective stapling units. As already explained, the first action of the toggle 506 of each unit is to move the cutter 458 (Fig. 22) against the wire at the lower end of the nipple 456, after which the resistance of the wire to the movement of the cutter causes the unit to be swung downwardly until its anvil 396 engages the insole. The downward swinging movement of the unit, therefore, by reason of the engagement of the cutter with the wire, serves to feed downwardly the wire for forming the staple to be used in the next shoe. When the unit is thereafter swung upwardly to the starting position determined, in the construction herein shown, by engagement of the stud 402 with the link 398, it moves relatively to the wire which accordingly enters the space between the inside former and the outside former until its lower end engages the lower wall of the guideway in the bar 388 along which the slide 448 (Fig. 22) is movable. After the engagement of the end of the wire with this wall the unit continues to move a short distance upwardly before it is stopped by the stud 402.

When the wire is thus fed downwardly by the downward movement of the stapling unit it slides past a spring-controlled brake member 720 (Fig. 16) in the form of a bell-crank one arm of which engages the wire and the other arm of which is controlled by a spring 722. This brake member is arranged to permit free downward movement of the wire but to prevent the wire from moving upward relatively to it, the member being pivotally mounted on a holder 724. It is of substantially the same construction as shown in Fig. 29 of Letters Patent No. 2,420,684, but as distinguished from that prior disclosure the holder 724 on which it is mounted is not a fixed member, but is movable upwardly and downwardly. Clamped in a split lower end portion of this holder is a non-flexible metal tube 726 slidingly movable upwardly and downwardly in a block 728 which, by means of a pin 730 extending rearwardly therefrom, is so mounted on the casting 394 as to permit it to turn about the axis of the pin. Fixed at its lower end in the nipple 456 is a flexible conduit 732 which extends upwardly within the tube 726 and is free to move upwardly and downwardly in the tube, this conduit serving as a guide for the wire. Between the block 728 and a flange 734 on the lower end of the tube 726 is a light spring 736. With the parts in starting positions as shown in Fig. 16, the lower end of the wire is in engagement with the lower wall of the guideway in the bar 388 and the holder 724 for the brake member 720 is spaced slightly above the upper face of the block 728. When the stapling unit is thereafter swung downwardly and the cutter 458 in engagement with the wire causes the wire to be pulled downwardly by the unit in the manner above explained, the holder 724 first moves a short distance downwardly with the brake member 720 until it engages the block 728, after which the wire slips past the brake member, and the conduit 732 moves downwardly with the wire in the tube 726. When the unit is swung upwardly after the staple-driving operation, the conduit 732 moves upwardly in the tube, but the wire is held by the brake member 720 against upward movement until its lower end is engaged by the above-mentioned lower wall of the guideway in the bar 388. Thereafter, as the unit is moved a short distance farther upwardly, it forces the lower end portion of the wire upwardly with it and, through the wire, the holder 724 for the brake member is moved upwardly away from the block 728 to the position shown in Fig. 16, the tube 726 receiving a corresponding upward movement and thereby compressing the spring 736. By reason of the provision thus afforded for upward movement of the brake member at this time and the provision of the tube 726 surrounding the flexible conduit 732, any danger is avoided of forming a kink in the wire by the upward pressure of the bar 388 against the end of the wire.

It will be understood that what is herein referred to as the cycle of operations of the machine corresponds to one complete revolution of the cam shaft 36. For operating the cam shaft the previously mentioned gear wheel 40 is engaged by a worm 738 (Fig. 2) fast on a shaft 740 on which is a friction clutch 742 shown in dotted lines, one element of this clutch being driven by an electric motor 744 shown diagrammatically in Fig. 37. This clutch and the means for controlling it are, except as hereinafter noted, of the same construction as disclosed in Letters Patent No. 2,160,846, and accordingly will not be herein described in complete detail. The clutch is actuated in the first instance to start the machine by means of a treadle 746 fast on a rockshaft 748 on which is also secured an upwardly extending arm 750 movable forwardly by the treadle against the resistance of a spring 752. Connected to this arm and movable forwardly thereby is a rearwardly extending bar 754 which corresponds to the bar 852 shown in the last-mentioned Letters Patent except that, for a purpose hereinafter explained, it is herein shown as made in two parts which normally move as a unit. By its forward movement the bar acts on a pin 756 to impart forward swinging movement to a lever 758 against the resistance of a spring 760 to trip the clutch in the manner disclosed in said Letters Patent. The lever 758 is thereafter first lowered and then raised by a bell-crank lever 762 operated by a cam track 764 in a cam wheel 766 on the shaft 36 to stop the rotation of the cam shaft prior to the completion of the cycle of operations and again at the end of the cycle.

Figure 2:
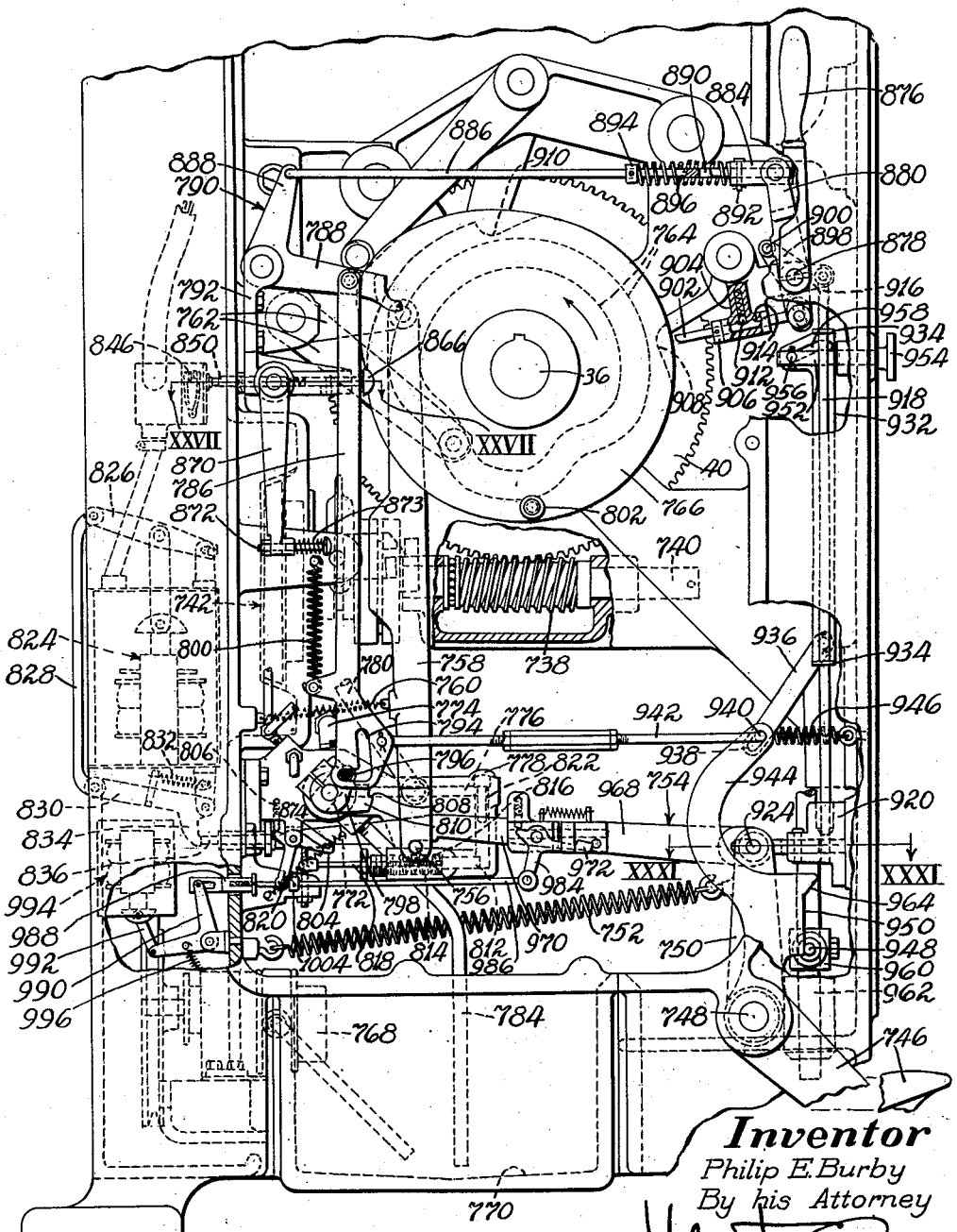
Fig. 2 is a view of the lower portion of the machine in left-hand side elevation, with parts broken away.

The fluid under pressure for operating the stapling units is supplied by a continuously driven pump 768 (Fig. 2) operated by the motor 744. This pump receives fluid from a reservoir or sump 770 and delivers it to a rotary valve 772 shown in dotted lines, this valve being of substantially the same construction as a corresponding valve shown for the same purpose in Letters Patent No. 2,420,684. A spring-controlled relief valve (not shown) determines the maximum pressure of the fluid delivered by the pump and permits the return of excess fluid to the sump. Fluid is delivered by the pump to the valve 772 through a conduit a portion of which is shown at 774 in Fig. 2. From the valve the fluid is delivered into a passageway 776 formed in a block 778 in which the valve is mounted, and from this passageway the fluid is conducted by a pipe line 780 to flexible tubes 782 (Fig. 1) communicating with the cylinders 534. As disclosed in Letters Patent No. 2,420,684, when the valve is in its initial position it causes fluid to be delivered from the pump to parts of the machine which require lubrication through conduits not herein shown in detail, the cylinders 534 at that time being open to exhaust through the pipe line 780, the passageway 776 and a pipe 784 leading to the sump. The valve 772 is controlled by an upwardly and downwardly extending bar 786 pivotally connected at its upper end to one arm 788 of a bell-crank lever 790 pivotally mounted on a bracket 792 on the frame. Formed in the lower end of the bar is a slot 794 into which extends a pin 796 mounted in an arm 798 secured to the valve, the slot 794 having an upwardly and downwardly extending portion and a substantially horizontal portion. Normally the pin is in the horizontal portion of the slot, as shown in Fig. 2, and a spring 800 which is connected to the bar 786 and tends to move it upwardly holds the valve in its initial position determined by a stop (not shown). Just before the cam shaft 36 is brought to a stop prior to the end of the cycle by the action of the cam track 764 on the clutch-controlling means a roll 802 carried by the cam wheel 766 engages the arm 788 of the bell-crank lever 790 and moves the bar 786 downwardly to turn the valve 772 into position to admit the fluid under pressure to the cylinders 534. The valve is retained in this position by a pivotally mounted latch 804 controlled by a spring 806, this latch engaging a shoulder 808 on an arm 810 also mounted to turn with the valve. Before the cam shaft comes to a stop the roll 802 passes beyond the end of the arm 788.

After the driving of the staples the valve 772 is returned to its initial position by the spring 800 acting on the bar 786 to release the fluid from the cylinders 534 and 600 and thus to permit the pistons 532 and 598 to be returned by the springs 544 and 610. To cause the valve thus to be returned there is provided a fluid-operated piston 812 (Fig. 2) movable in a cylinder 814 formed in the block 778 against the resistance of a spring 816, this piston having a rod 818 extending rearwardly therefrom and arranged to engage an arm 820 on the latch 804 to disconnect the latch from the valve. Fluid is admitted to the cylinder 814 from the passageway 776 through a restricted passage 822 in the block 778. The spring 816 is of such strength that the piston 812 is operated to release the valve in response to such increase of pressure in the passage 776 as occurs after the staples have been driven and the pistons 532 and 598 have arrived at the ends of their operative movements.

Figure 38:
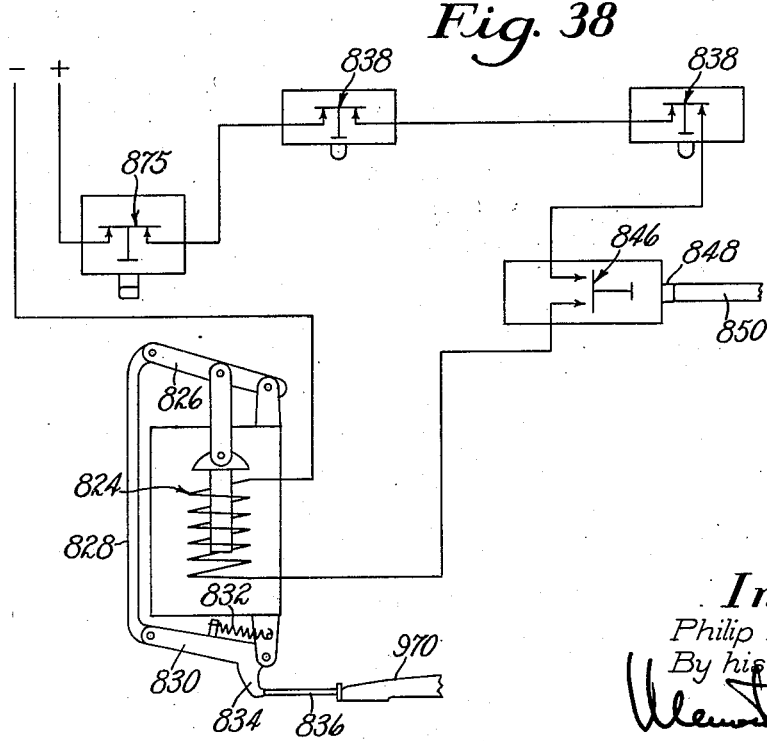
Fig. 38 is a diagrammatic view showing the electrical circuit of means provided for actuating the clutch to cause the completion of the cycle after the operations of the fastening-inserting mechanisms.

Instead of being operated by the treadle 746 to start the cam shaft 36 the second time after the driving of the staples, the bar 754 is moved forwardly by electrical means comprising a solenoid 824 which imparts downward swinging movement to a lever 826 connected by a link 828 to another lever 830 which is movable against the resistance of a return spring 832, this lever having thereon a finger 834 arranged to move forwardly in a bearing in the frame a rod 836 which engages the rear end of the bar 754. For energizing the solenoid 824 there is provided an electrical circuit which includes two switches 838 (Fig. 38) mounted in switch boxes 840 (Fig. 1) and arranged to be closed in response to the upward movements of the pistons 532 in the return of the stapling units to their starting positions. For this purpose upwardly extending bars 842 secured to the members 550 which are formed on the pistons are arranged to act on switch-closing levers 844. Insurance is thus afforded that both stapling units will have been returned to starting positions before the cycle of operations is resumed. In the circuit controlled by the switches 838 there is also a third switch 846 (Figs. 2 and 38) which has to be closed before the clutch is actuated by the solenoid. A push button 848 (Fig. 27) for closing this switch is engaged by the rear end of a rod 850 slidingly movable in the bracket 792. Extending into a bore in this rod is a diametrically reduced stem portion 852 of another rod 854 slidingly movable in the bracket, and between the front end of the rod 850 and a shoulder on the rod 854 is a compression spring 856. A small pin 858 in the stem 852 lies in a slot 860 in the rod 850 to limit relative movements of these rods, and a pin 862 in the rod 854 extends through a slot 864 in the bracket 792 to limit movement of the latter rod. On the front end of the rod 854 is a head 866 having a convex face arranged to be engaged by the roll 802 on the cam wheel 766 after the roll passes beyond the arm 788. By thus engaging the head 866 the roll pushes the rod 854 rearwardly, and when the cam shaft 36 comes to a stop prior to the stapling operations the roll is thus in engagement with the head 866. When the rod 854 is thus moved rearwardly, however, it does not operate the rod 850 to close the switch 846, but only compresses the spring 856, since the rod 850 is held frictionally against rearward movement. For this purpose there is mounted in the bracket 792 a shaft 868 through a hole in which the rod 850 extends, and fast on this shaft is a downwardly extending arm 870. Slidingly mounted in the lower end of this arm is a rod 872 (Fig. 2) having on its front end an enlarged head arranged to be engaged by the bar 786, a compression spring 873 being mounted between this head and the arm. A nut on the rear end of the rod limits its movement by the spring. When the bar 786 is moved downwardly by the arm 788 to operate the valve 772 it has a component of rearward movement due to the swinging of the arm, and by this rearward movement the bar, through its engagement with the head on the front end of the rod 872, forces this rod a short distance rearwardly against the resistance of the spring 873. The force thus transmitted to the arm 870 tends to turn the shaft 868 and thereby causes the rod 850 to be held frictionally against rearward movement when the roll 802 acts on the rod 854. When, however, the valve 772 is released by the latch 804 and the bar 786 is moved upwardly by the spring 800, the bar releases the rod 872, whereupon the rod 850, no longer held against rearward movement, is moved rearwardly by the spring 856 to close the switch 846. This causes the solenoid 824 to actuate the clutch. Upon the starting of the cam shaft 36 the roll 802 releases the rod 854, whereupon the switch 846 automatically opens. This deenergizes the solenoid 824, so that the bar 754 will return and the machine may be started the next time by the treadle notwithstanding the fact that the switches 838 remain closed. The bar 754 is thus returned by a spring 874. Also in the circuit of the solenoid 824 is a hand switch 875 (Fig. 38).

It may sometimes be desired, as for test purposes, to operate the stapling units independently of any cycle of operations of the machine. Accordingly, the machine is provided with a hand lever 876 (Figs. 2 and 28) fast on a shaft 878 rotatable in a bearing in the frame, and loosely mounted on this shaft is an upwardly extending arm 880 provided in its forked upper end with a stud 882 on which is mounted a block 884. Slidingly mounted in this block and in the stud 882 is a rearwardly extending rod 886 connected at its rear end to an arm 888 of the bell-crank lever 790. Formed in the rod 886 is a slot 890 (Fig. 2) through which extends a pin 892 in the block 884. Between the block and a collar 894 fast on the rod 886 is a spring 896. The pin 892 is normally at the front end of the slot 890 in position to impart forward movement to the rod 886 in response to forward movement of the arm 880 and thereby to move the valve 772 to the position where it is held by the latch 804. For thus swinging the arm 880 in a forward direction there is fast on the shaft 878 a lever 898 one arm of which carries a pin 900 arranged to engage the rear face of the arm 880 and to swing the arm in response to forward movement of the hand lever 876. A downwardly extending arm of the lever 898 is connected to a rod 902 slidingly movable in a fixed bracket 904, the rod having fast thereon a collar 906 arranged to engage the bracket to limit movement of the rod in a forward direction. At any time when the machine is running engagement of the rod with the periphery of the cam wheel 766 will prevent such forward movement of the hand lever 876 as to operate the valve 772, but when the parts are in starting positions a recess 908 in the cam wheel receives the rod and permits such movement of the hand lever. Another recess 910 in the cam wheel, moreover, is positioned opposite to the inner end of the rod when the cam shaft 36 comes to a stop prior to the end of the cycle, which permits the hand lever to be operated at that time to cause the operation of the stapling units under conditions hereinafter explained. Mounted in the bracket 904 is a spring-pressed detent 912 of ball shape arranged to enter one or the other of a pair of recesses 914 in the rod 902 to assist in holding the hand lever 876 either in its initial position or in the position to which it is moved in operating the valve.

In order to avoid danger of damage to the machine, there is further provided means for preventing depression of the treadle 746 to actuate the clutch at any time when the stapling units are being operated. For this purpose there is integral with the arm 880 a short forwardly extending arm 916 to which is pivotally connected the upper end of a downwardly extending rod 918. The lower end of this rod is guided in an opening in a block 920 fast on the frame, and horizontally movable in this block is a short rod 922 (Fig. 31) connected to a stud 924 through which the clutch-actuating bar 754 is operated by the arm 750. Rearward movement of the rod 922 is limited by a vertical pin 926 mounted in the block 920 and extending through a slot 928 in the rod. This limits rearward movement of the arm 750 by the spring 752. Formed in the block 920 is a hole 930 arranged to receive the lower end of the rod 918. Whenever the valve 722 is operated, either automatically by the bell-crank lever 790 or manually by the hand lever 876, the rod 918 is moved downwardly into the hole 930 in front of the rod 922 and thereby prevents any depression of the treadle until the valve 772 is returned to its initial position. In case downward movement of the rod 918 is obstructed, as by reason of some slight accidental forward movement of the rod 922, the spring 896 on the link 886 will yield when the valve is operated by the bell-crank lever 790.

It may sometimes be desired, as for test purposes, to run the machine without operating the stapling units. To permit this to be done, a vertical bar 932 is guided for upward and downward movements along the rod 918 by means of laterally extending lugs 934 on its upper and lower ends. The lower end of the bar is pivotally connected to a link 936 provided in its lower end with a slot 938 into which extends a pin 940 on the front end of a rearwardly extending link 942, this link being pivotally connected at its rear end to the lower end of the valve-operating bar 786. The pin 940 is further mounted in the upper end of a lever 944 which is loosely mounted at its lower end on the shaft 748. A spring 946 connected to the pin 940 tends to swing the lever 944 in a forward direction and holds the lower end of the bar 786 normally in the position in which the pin 796 is in the horizontal portion of the slot 794. The movement of the lever 944 in this direction is limited by engagement of a pin 948 with a front face 950 on the lever, the pin 948 being mounted as hereinafter described. By downward movement, therefore, the bar 932 will act through the link 936 to move the link 942 in a rearward direction and thereby to swing the valve-operating bar 786 to a position in which the pin 796 is at the lower end of the upwardly and downwardly extending portion of the slot 794 in the bar. With the bar 786 in this position it will have no effect on the valve 722 when it is moved downwardly by the bell-crank lever 790 in the cycle of operations and the stapling units therefore will not be operated. It will also be evident that under these conditions the hand lever 876 will have no effect on the valve. For thus moving the bar 932 downwardly and for holding it in its depressed position there is slidingly mounted in the frame a rod 952 having a knob 954 on its front end for moving it, the rod having thereon a pin 956 movable along a cam slot 958 in the upper end portion of the bar. It will be evident that when the link 942 is thus moved rearwardly by the bar 932 the lever 944 is swung idly in a rearward direction.

If the machine is operated in the absence of any shoe, the operation of the stapling units is also prevented, even though the bar 932 has not been moved downwardly. For this purpose the above-mentioned pin 948 which engages the front face 950 of the lever 944 is mounted in a block 960 which is fast on a vertically movable rod 962, this being a rod which, in a machine of the type to which the invention is shown as applied, moves upwardly with the toe rest 6 when the toe rest is applied to the shoe. If there is no shoe in the machine the toe rest, and therefore the rod 962, will move farther upward than if a shoe is present. Accordingly, there is provided on the lever 944 a cam face 964 which is acted upon by the pin 948 to swing the lever rearwardly in response to the extra upward movement of the rod 962 when there is no shoe in the machine. In this manner the bar 786 is moved into position to prevent operation of the valve, the pin 940 moving along the slot 938 in the link 936.

If the cam shaft 36 comes to a stop prior to the end of the cycle after the bar 932 has been moved downwardly as above described to prevent operation of the stapling units, and the operator then desires to cause the units to operate, he first moves the rod 952 inwardly to raise the bar 932, so that the valve-operating bar 786 will be swung to the position in which the pin 796 is in the horizontal portion of the slot 794, and then swings the hand lever 876 forwardly to operate the valve 772. The movement of the hand lever is permitted at this time by reason of the fact that the depression 910 in the cam wheel 766 is in a position opposite to the end of the rod 902.

The machine herein shown is further provided with means for preventing any tripping of the clutch 742 by depression of the treadle 746 when the electric motor 744 which operates the machine through the clutch is not running. It will be evident that if the clutch should thus have been tripped the machine would start in response to the closing of the motor circuit by the usual switch (not shown), and the operator, not being aware that the clutch had been tripped, might be injured. For the purpose in view the clutch-actuating bar 754 is, as already stated, made in two parts, these parts comprising a front part 968 connected to the arm 750 and a rear part 970 to which the return spring 874 is connected. When the motor is running the two parts of the bar are connected together by a latch 972 (Figs. 2, 29 and 30) which is pivotally mounted on a block 974 secured to the rear part 970 and engages the front face of a projection 976 formed on a block 978 fastened on the front part 968. A spring-pressed pin 980 engaging a tail 982 on the latch holds the latch, when permitted, in position thus to connect the two parts of the bar, as shown in Figs. 29 and 30. Under these conditions, therefore, the two parts of the bar 754 act as one to trip the clutch upon depression of the treadle. Extending downwardly from the latch 972 is an arm 984 pivotally connected to a rearwardly extending link 986 the rear end of which is secured to a rod 988 (Fig. 2) slidingly movable in the frame. At its rear end this rod has a pin-and-slot connection with one arm of a bell-crank lever 990 pivotally mounted on the frame, the other arm of this bell-crank lever being connected by a link 992 to the movable element of a solenoid 994 in circuit with the motor 744. When the motor is running this solenoid holds the bell-crank lever 990 in such a position that the latch 972 is held by the spring-pressed pin 980 in position to connect the two parts of the bar 754. When the motor circuit, however, is broken a spring 996 connected to the bell-crank lever 990 swings the latch 972 to inoperative position, as shown in Fig. 2. If the treadle 746 is depressed under these conditions only the front part 968 of the bar 754 is moved forwardly by the treadle without any effect on the clutch. In such forward movement the part 968 is guided by a pin 998 which is secured in the block 974 and extends into a bore in the block 978. Upon release of the treadle the part 968 is returned into abutting relation to the part 970 by a light spring 1000 connected to pins mounted in the two parts. This spring is required thus to return the part 968 by reason of the fact that the stud 924 extends through a slot 1002 in the part 968 to permit the movement of the bar 754 in a forward direction by the solenoid 824 to start the cam shaft 36 the second time in the manner hereinbefore explained.

In the construction herein shown the latch 804 associated with the valve 772 is so controlled by the link 986 that if the hand lever 876 is moved forwardly at any time when the motor 744 is not running, the valve will not be held by the latch against return movement but will be returned to its initial position when the hand lever is returned. Insurance is thus afforded that the stapling units will not be operated immediately in response to the starting of the motor 744, as they otherwise would be because of the movement of the hand lever, since the pump 768 is operated by this motor. For the purpose in view there is fixed on the link 986 a collar 1004 arranged to engage the arm 820 on the latch and thus to hold the latch in a retracted position.

Figure 37:
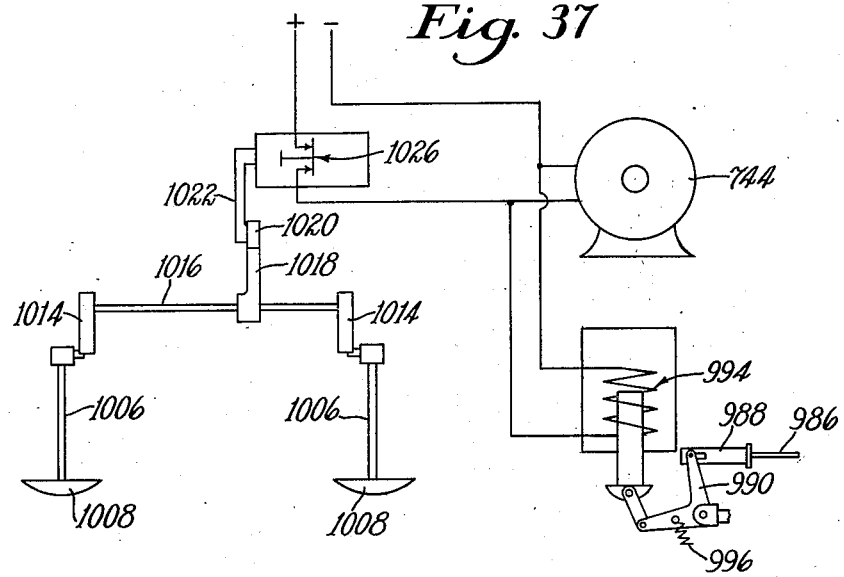
Fig. 37 is a diagrammatic view showing the electrical circuit of the motor which drives the machine.

In order to adjust the wipers by means of the hand wheel 50 (Fig. 6) the operator has to reach inwardly either from one side or the other of the head of the machine. To guard against any possible injury which he might receive at this time by reason of accidental starting of the machine, there is provided means which necessitates the breaking of the circuit of the electric motor 744 if the operator is to gain access to the hand wheel. For this purpose there is slidingly mounted in the head casting 430, identified in Fig. 19, two vertical rods 1006 (Figs. 1 and 5) which extend downwardly in the spaces near the opposite sides of the machine into which the operator must insert his hand to reach the hand wheel, each rod having fast on its lower end a disk 1008. At its upper end each rod carries a pin 1010 arranged to move upwardly in a slot 1012 formed in an arm 1014 fast on a rock shaft 1016 in the head casting. Also fast on the rockshaft is an arm 1018 arranged to engage a roll 1020 carried by an arm 1022 which is fast on a shaft 1024 mounted to turn in a switch box 1026. In response to the turning of this shaft in a counterclockwise direction with reference to Fig. 5 a normally closed switch 1026 in the switch box, shown diagrammatically in Fig. 37, is opened, this switch being in the circuit of the motor 744. Such turning of the shaft 1024 results from the action of either of the pins 1010 on an inclined face 1028 on the corresponding arm 1014 as the rod 1006 starts to move upward. Such upward movement is imparted to either rod by engagement of the operator's hand with the disk 1008 on the lower end of the rod when he wishes to reach the hand wheel 50, insurance thus being afforded that if the motor 744 is running it will come to a stop.

To receive and support the shoe when it is released at the end of the cycle of operations the machine herein shown is provided with a shoe receiver 1030 (Fig. 1) the construction of which is generally as disclosed in Letters Patent No. 2,420,684, except that it is mounted in a fixed position on the front of the frame instead of being movably mounted as in the construction shown in said Letters Patent.

The manner of the normal operation of the machine, in so far as it is of interest with reference to the present invention, will now be briefly summarized, the relative timing of different operations in the course of the cycle being indicated on the chart (Fig. 39). The operator presents a shoe to the machine in a position determined by engagement of the plate 2 with the inner face of the lip at the toe end of the insole and then starts the cycle of operations by depression of the treadle 146. Substantially at the beginning of the cycle the toe rest 6 and the heel rest 8 are moved into shoe-supporting positions, the toe rest forcing the shoe upwardly against the pins 4 and clamping it against the pins. Early in the cycle the wipers 10 are advanced and closed to bring their wiping edges into positions for wiping the upper around the toe heightwise of the last, and they are moved upwardly by upward swinging movement of the wiper carrier 16 to cause them thus to act on the upper. After the upward movements of the wipers they are further advanced and closed to wipe the marginal portion of the upper inwardly over the feather and against the lip of the insole. They are then partially retracted and opened and are raised slightly to relieve their downward pressure on the upper, after which they are again moved inwardly to their fully advanced and closed positions and are moved downwardly to increase the pressure. At this point in the cycle, namely at 270° as indicated on the chart, the cycle is automatically interrupted by the cam-operated clutch-controlling means.

Early in the above-described portion of the cycle the wire-feeding mechanism is operated to feed the binder wire through the right-hand gripper 98, along the curved guideway 360 around the toe and through the left-hand gripper, the wire-feeding operation terminating at 95° of the cycle. In this operation the grippers 98 are moved forwardly lengthwise of the shoe by the adjustable portion of the wire-feeding mechanism a variable distance depending upon the amount of wire fed by this mechanism. Thereafter, in response to the upward movement of the wiper carrier 16, the grippers 98 are closed on the wire, the portion of the wire to be used as the binder is severed from the remainder of the wire and the guideway 360 for the wire is opened by the member 362. The grippers 98 are then moved forwardly by their operating mechanism to apply a yielding pull to the binder and are moved inwardly into engagement with the sides of the shoe in response to resistance of the shoe to their forward movements. As indicated on the chart, this action of the gripper-operating mechanism takes place between 120° and 190° of the cycle, during part of which time the wipers are being operated to wipe the marginal portion of the upper inwardly over the insole. At the completion of the movement of the gripper-operating mechanism the springs 136 (Fig. 3) are under compression resulting from the movement of the lever 128. The grippers thus pull the binder first into a position between the wipers and the upper at the extreme edge of the shoe bottom, and when the wipers are thereafter partially retracted and also raised in the manner hereinabove described, the grippers are operated by expansion of the springs 136 to pull the binder farther inwardly under the wipers into engagement with the upstanding margin of the upper. At this time the binder holddown member 672 (see Fig. 32) immediately in front of the wipers prevent portions of the binder adjacent to the ends of the wipers from rising too far, these holddown members having been moved inwardly widthwise of the shoe into positions for thus controlling the binder in response to the upward movement of the wiper carrier 16.

Immediately prior to the above-mentioned interruption of the cycle the roll 802 (Fig. 2) acts on the bell-crank lever 790 to turn the valve 772 into position to admit operating fluid to the cylinders 534 and the valve is retained in that position by the latch 804. The roll passes beyond the arm 786 of the bell-crank lever and comes to rest in engagement with the head 866 (Fig. 27) of the rod 854, forcing this rod rearwardly and thereby compressing the spring 856. Rearward movement of the rod 850 at this time, however, is prevented by the cramping action thereon of the arm 870 by reason of force applied to the latter by the valve-operating bar 786. The first action of the pistons 532 in the cylinders 534 is to force the cutters 458 into engagement with the staple-forming wire at the lower ends of the nipples 456 in the stapling units 386, since downward swinging movements of the units are yieldingly resisted by the springs 610 controlling the pistons 598. By reason of the resistance of the wire thereafter the units are swung downwardly until their anvil members 396 engage the bottom of the insole before the wire is cut, the wire being pulled downwardly past the brake members 720 by the downward movements of the units. In this operation the V-shaped portions of the binder-spreading devices 658 are moved downwardly between the upper and portions of the binder located just beyond the units in a heelward direction to space these portions of the binder, held taut by the grippers, outwardly from the upper (Fig. 34). As the units are thus swung downwardly, enough fluid passes from the cylinders 534 into the cylinders 600 past the sleeves 632 on the pistons 532 and the sleeves 634 on the pistons 598 to facilitate such short downward movements of the pistons 598 as result from the movements of the units. In response to resistance of the shoe to further downward movements of the units after the anvil members 396 have engaged the insole the toggles 506 are straightened to cut the wire and to form the staples by inward movements of the slides 448 (Fig. 22) toward the shoe. At this time the units are moved in outward directions to seat the anvil members against the inner face of the lip of the insole by the action of the rolls 564 carried by the pistons 532 on the cam members 552 connected to the swinging links 392 on which the units are supported.

As the slides 448 are moved inwardly toward the shoe the binder-positioning fingers 482 and 484 (Fig. 22) first move with them until the lugs 485 on the lower fingers engage the binder which is held taut by the grippers and portions of which near the fingers are spaced from the upper by the spreading devices 658. Thereafter, because of the resistance of the binder, the inward movements of the fingers are retarded and the slides 448 with their throat members 478 move relatively to them, causing the pins 496 in the slots 498 to move the fingers of each unit equal distances toward each other and thereby to position the binder between them in proper relation to the staple guideways in the throat members 478. Prior to the completion of the movements of the slides 448 the throat members engage the shoulders 504 on the fingers and force them inwardly against the upper in the angle between the feather and the lip of the insole (Fig. 35), the lugs 485 on the lower fingers forcing the binder inwardly into position to receive the staples.

During the above-described movements of the throat members 478 and fingers 482 and 484 the driver-operating toggles 592 are prevented from acting by engagement of the pins 628 (Fig. 16) on the arms 622 with the extensions 630 of the driver-operating slides 580. As the toggles 506 complete their movements their links 510 swing the arms 622 downwardly and thus release the slides 580, whereupon the fluid admitted to the cylinders 600 from the cylinders 534 through the passageways 633 acts on the pistons 598 to straighten the toggles 592 and drive the staples. The staples are thus driven through the upstanding margin of the upper and the lip of the insole and their legs are clinched by the anvil members 396 in directions toward the toe end of the shoe (Fig. 36). Prior to the completion of the straightening of the toggles 592 the fingers 646 on the blocks 644 which are mounted on the toggle links 590 engage the lugs 648 (Fig. 12) on the jaw-closing cams 216 and cause the grippers 98 to open and release the binder, the grippers being moved forwardly to clear the ends of the binder by further expansion of the springs 136. It will be understood that the binder at this time is held firmly in place against the upper around the toe by the pressure of the wipers against it.

After the driving of the staples the increase in the pressure of the operating fluid causes the small piston 812 (Fig. 2) to move against the resistance of the spring 816 and thus to move the latch 804 into position to release the valve 772 which is then returned by the spring 880 acting on the bar 786 into position to release the fluid from the cylinders 534 and 600. This causes the pistons 532 and 598 to be moved upwardly to their initial positions by the springs 544 and 610, and at the same time the release of the pressure of the bar 786 on the rod 872 relieves the cramping action of the arm 870 on the rod 850 (Fig. 27). This rod is therefore moved rearwardly by the spring 856 to close the switch 846 (Figs. 2 and 38). In response to the upward movements of the pistons the parts of the stapling units are returned to their initial positions and the units are swung upwardly to the positions determined by the studs 402 and the links 398 and are also moved inwardly toward each other by the action of the rolls 564 on the links 552. In response to the upward movements of the units the hook-shaped ends 670 of the members 668 bend upwardly the free end portions of the binder extending beyond the staples. As the units are thus moved upwardly the wire for use in forming the next staples, held initially against upward movement by the brake members 720, enters the units between the inside and outside formers, the flexible conduits 732 moving upwardly in the tubes 726, until the lower ends of the two strands of wire abut against the lower walls of the guideways for the slides 448. Thereafter short further upward movements of the units also raise the lower portions of the wire and act through the wire correspondingly to lift the brake members 720, their holders 724 and the tubes 726. As the two units near the limits of their upward movements the bars 842 carried by the pistons 532 close the switches 838 in the circuit of the solenoid 824 and, since the switch 846 is closed, cause the solenoid to actuate the clutch 742 by imparting forward movement to the bar 754. The cam shaft 36 is thus started again to cause the machine to complete the cycle and to return to starting positions parts which have not already been returned. As the cam shaft starts, the roll 802 releases the rod 854, thus causing the switch 846 to open, so that the clutch-actuating bar 754 will be returned by its spring 874.

While the machine herein shown is provided with means for applying to shoes binders made of wire, it is to be understood that in various novel aspects the invention is not limited to the use of binder material of that particular character.

Having described the invention, what I claim as new and desire to secure by Letters Patent of the United States is:

1. In a lasting machine, means for working the toe-end portion of an upper on a last into lasted position, grippers for gripping at the opposite sides of the last respectively binder material extending around the toe end of the upper and for pulling it lengthwise of the last to apply it to the upper, means for feeding binder material around the toe from one of said grippers to the other gripper, said feeding means being adjustable to vary the amount of binder material thus fed, and means for moving said grippers lengthwise of the last a predetermined distance depending upon the amount of material thus fed before they grip the material.

2. In a lasting machine, means for working the toe-end portion of an upper on a last into lasted position, grippers for gripping at the opposite sides of the last respectively binder material extending around the toe end of the upper and for pulling it lengthwise of the last to apply it to the upper, means for feeding binder material around the toe from one of said grippers to the other gripper, said feeding means being adjustable to vary the amount of binder material thus fed, and mechanism arranged to be operated by said feeding means to move said grippers lengthwise of the last a predetermined distance depending upon the amount of material thus fed before they grip the material.

3. In a lasting machine, means for working the toe-end portion of an upper on a last into lasted position, grippers for gripping at the opposite sides of the last respectively binder material extending around the toe end of the upper and for pulling it lengthwise of the last to apply it to the upper, means including a lever for feeding binder material around the toe from one of said grippers to the other gripper, means for varying the extent of movement of said lever to vary the amount of binder material thus fed, and mechanism arranged to be operated by said lever to move said grippers lengthwise of the last a predetermined distance depending upon the extent of the movement of the lever before they grip the material.

4. In a lasting machine, means for working the toe-end portion of an upper on a last into lasted position, grippers for gripping at the opposite sides of the last respectively binder material extending around the toe end of the upper, mechanism for operating said grippers after they have gripped the binder material to pull it lengthwise of the last and thereby to apply it to the upper, means for feeding binder material around the toe from one of said grippers to the other gripper before they grip the material, said feeding means being adjustable to vary the amount of material thus fed, and means arranged to act on said gripper-operating mechanism to move the grippers lengthwise of the last a predetermined distance depending upon the amount of material thus fed before they grip the material.

5. In a lasting machine, means for working the toe-end portion of an upper on a last into lasted position, grippers for gripping at the opposite sides of the last respectively binder material extending around the toe end of the upper, mechanism for operating said grippers after they have gripped the binder material to pull it lengthwise of the last and thereby to apply it to the upper, a cam for operating said mechanism, means for feeding binder material around the toe from one of said grippers to the other gripper, said feeding means being adjustable to vary the amount of material thus fed, and means for moving said gripper-operating mechanism independently of its cam to move the grippers lengthwise of the last a distance variably determined in accordance with the adjustment of said feeding means before they grip the material.

6. In a lasting machine, means for working the toe-end portion of an upper on a last into lasted position, grippers for gripping at the opposite sides of the last respectively binder material extending around the toe end of the upper, mechanism for operating said grippers after they have gripped the binder material to pull it lengthwise of the last and thereby to apply it to the upper, means for feeding binder material around the toe from one of said grippers to the other gripper, said feeding means being adjustable to vary the amount of material thus fed, and means for imparting to said gripper-operating mechanism by the action of said feeding means movement to position the grippers lengthwise of the last in accordance with the adjustment of the feeding means before they grip the material.

7. In a lasting machine, means for working the toe-end portion of an upper on a last into lasted position, grippers for gripping at the opposite sides of the last respectively binder material extending around the toe end of the upper and for pulling it lengthwise of the last to apply it to the upper, means for closing said grippers on the binder material, means for feeding binder material around the toe from one of said grippers to the other gripper, said feeding means being adjustable to vary the amount of material thus fed, and means for automatically positioning said grippers before they are closed at a greater distance from the end of the toe the greater the amount of material fed by the feeding means.

8. In a lasting machine, means for working the toe-end portion of an upper on a last into lasted position, grippers for gripping at the opposite sides of the last respectively binder material extending around the toe end of the upper, means for moving said grippers lengthwise of the last to apply the binder material to the upper, and mechanisms arranged to be operated by the means for thus moving the grippers to move them inwardly toward the upper widthwise of the last in response to resistance of the upper to their movements lengthwise of the last.

9. In a lasting machine, means for working the toe-end portion of an upper on a last into lasted position, grippers for gripping at the opposite sides of the last respectively binder material extending around the toe end of the upper, operating means for moving said grippers lengthwise of the last to apply the binder material to the upper, said operating means including members relatively movable in response to resistance of the upper to the movements of the grippers lengthwise of the last, and means for moving the grippers inwardly toward the upper widthwise of the last in response to the relative movement of said members.

10. In a lasting machine, means for working the toe-end portion of an upper on a last into lasted position, grippers for gripping at the opposite sides of the last respectively binder material extending around the toe end of the upper, means supporting said grippers and mounted for movement lengthwise of the last to cause them to pull the binder material against the toe end of the upper, mechanisms carried by said supporting means for moving the grippers inwardly toward the upper widthwise of the last, and means for operating said mechanisms thus to move the grippers inwardly in response to resistance of the upper to the movement of said supporting means lengthwise of the last.

11. In a lasting machine, means for working the toe-end portion of an upper on a last into lasted position, grippers for gripping at the opposite sides of the last respectively binder material extending around the toe end of the upper, means supporting said grippers and mounted for movement lengthwise of the last to cause them to pull the binder material against the toe end of the upper, gear mechanisms carried by said supporting means for moving the grippers inwardly toward the upper widthwise of the last, and rack bars connected to said gear mechanisms and movable lengthwise of the last thus to move the grippers inwardly in response to resistance of the upper to the movement of said supporting means lengthwise of the last.

12. In a lasting machine, means for working the toe-end portion of an upper on a last into lasted position, grippers for gripping at the opposite sides of the last respectively binder material extending around the toe end of the upper, means supporting said grippers and mounted for movement lengthwise of the last to cause them to pull the binder material against the toe end of the upper, members mounted for movement lengthwise of the last thus to move said supporting means, springs for transmitting movement from said members to said supporting means, said springs being yieldable in response to resistance of the upper to the movements of the grippers lengthwise of the last, and mechanisms for moving the grippers inwardly toward the upper widthwise of the last by further movement of said members upon yield of said springs.

13. In a lasting machine, means for working the toe-end portion of an upper on a last into lasted position, grippers for gripping at the opposite sides of the last respectively binder material extending around the toe end of the upper, means for moving said grippers lengthwise of the last to apply the binder material to the upper, and gear mechanisms associated respectively with the different grippers for moving them inwardly widthwise of the last into engagement with the upper, each of said gear mechanisms including a pair of gears and a spring arranged to transmit movement from one of said gears to the other and to yield after engagement of the gripper with the upper.

14. In a lasting machine, means for working the toe-end portion of an upper on a last into lasted position, grippers for gripping at the opposite sides of the last respectively binder material extending around the toe end of the upper and for pulling said material lengthwise of the last to apply it to the upper, gear mechanisms associated respectively with said different grippers for moving them inwardly widthwise of the last into engagement with the upper, and members movable lengthwise of the last to cause the grippers thus to pull the binder material and further movable in the same direction to operate said gear mechanisms, the gear mechanisms each including a pair of gears and a spring arranged to transmit movement from one of said gears to the other and to yield after engagement of the gripper with the upper.

15. In a lasting machine, wipers for wiping the marginal portion of an upper around the toe end of a last inwardly over the feather and against the lip of a welt shoe insole on the last, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, and holddown members arranged to engage the binder in locations between the wipers and said grippers and to position it in those locations heightwise of the shoe as it is thus pulled against the margin of the upper by the grippers.

16. In a lasting machine, wipers for wiping the marginal portion of an upper around the toe end of a last inwardly over the feather and against the lip of a welt shoe insole on the last, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, and holddown members arranged to engage the binder in locations between the wipers and said grippers and to position it in those locations heightwise of the shoe as it is thus pulled against the margin of the upper by the grippers, each of said holddown members having a binder-engaging face convexly curved widthwise and heightwise of the shoe for guiding the binder to its proper position against the upper.

17. In a lasting machine, wipers for wiping the marginal portion of an upper around the toe end of a last inwardly over the feather and against the lip of a welt shoe insole on the last, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, and holddown members arranged to engage the binder in locations adjacent to the front ends of the wipers and to position the binder in those locations heightwise of the shoe as it is thus pulled against the margin of the upper by the grippers, said holddown members being resiliently flexible to permit them to yield lengthwise of the shoe if engaged by the wipers.

18. In a lasting machine, wipers for wiping the marginal portion of an upper around the toe end of a last inwardly over the feather and against the lip of a welt shoe insole on the last, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, holddown members for engaging the binder in locations between the wipers and said grippers and for positioning it in those locations heightwise of the shoe as it is thus pulled against the margin of the upper by the grippers, and means for moving said holddown members to positions in engagement with the upper in the angle between the feather and the lip of the insole after the presentation of the shoe to the machine.

19. In a lasting machine, wipers for wiping the marginal portion of an upper around the toe end of a last inwardly over the feather and against the lip of a welt shoe insole on the last, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, holddown members for engaging the binder in locations between the wipers and said grippers and for positioning it in those locations heightwise of the shoe as it is thus pulled against the margin of the upper by the grippers, supports for said holddown members mounted for movements widthwise of the shoe, and means for thus moving said supports to carry said members into engagement with the upstanding margin of the upper at the opposite sides of the shoe after the presentation of the shoe to the machine.

20. In a lasting machine, wipers for wiping the marginal portion of an upper around the toe end of a last inwardly over the feather and against the lip of a welt shoe insole on the last, a wiper carrier supporting said wipers and movable heightwise of the shoe to cause the wipers first to wipe the upper in that direction, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, holddown members for engaging the binder in locations between the wipers and said grippers and for positioning it in those locations heightwise of the shoe as it is thus pulled against the margin of the upper by the grippers, and means for moving said holddown members widthwise of the shoe into positions thus to control the binder in response to the movement of said wiper carrier heightwise of the shoe.

21. In a lasting machine, wipers for wiping the marginal portion of an upper around the toe end of a last inwardly over the feather and against the lip of a welt shoe insole on the last, a wiper carrier supporting said wipers and movable heightwise of the shoe to cause the wipers first to wipe the upper in that direction, means for partially retracting said wipers lengthwise and widthwise of the shoe after they have thus wiped the upper inwardly and for then moving them inwardly again to complete the wiping operation on the upper, grippers for gripping at the opposite sides of the shoe respectively beyond the wipers a binder extending around the toe end of the upper and for pulling the binder inwardly against the upstanding margin of the upper as the wipers are thus partially retracted, holddown members for engaging the binder in locations between the wipers and said grippers and for positioning it in those locations heightwise of the shoe as it is thus pulled against the margin of the upper by the grippers, supports for said holddown members mounted for movements widthwise of the shoe to carry said members inwardly toward the shoe into positions thus to control the binder, springs tending thus to move said supports, and flexible cables connected to said supports and to the wiper carrier for holding the supports initially retracted against the resistance of said springs and for causing them to be moved inwardly by the springs in response to the movement of the wiper carrier heightwise of the shoe.

22. In a lasting machine, means for applying a binder around the toe end of an upper to hold the upper in lasted position in the angle between the feather and the lip of a welt shoe insole, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, and a pair of binder-positioning members associated with each of said throat members and relatively movable heightwise of the shoe to engage and position the binder between them in a location between the throat member and the shoe.

23. In a lasting machine, means for applying a binder around the toe end of an upper to hold the upper in lasted position in the angle between the feather and the lip of a welt shoe insole, drivers for inserting fastenings in directions widthwise of the shoe in the margin of the upper and the lip of the insole at the opposite sides of the shoe respectively to fasten the binder to the shoe, throat members associated respectively with the different drivers and having guideways for the fastenings, means for moving said throat members inwardly toward the shoe prior to the insertion of the fastenings, and a pair of binder-positioning members associated with each of said throat members and relatively movable heightwise of the shoe to engage and position the binder between them in a location between the throat member and the shoe, said pair of binder-positioning members having guideways therein arranged to aline with the guideway in the throat member.

24. In a lasting machine, means for applying a binder around the toe end of an upper to hold the upper in lasted position in the angle between the feather and the lip of a welt shoe insole, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, and a pair of binder-positioning members associated with each of said throat members and relatively movable heightwise of the shoe to engage and position the binder between them in a location between the throat member and the shoe, said binder-positioning members being arranged to engage the shoe and to limit by such engagement the movement of the throat member toward the shoe.

25. In a lasting machine, means for applying a binder around the toe end of an upper to hold the upper in lasted position in the angle between the feather and the lip of a welt shoe insole, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and relatively movable heightwise of the shoe to engage and position the binder between them in a location between the throat member and the shoe, and means for effecting such relative movement of the binder-positioning members by the movement of the throat member toward the shoe.

26. In a lasting machine, means for applying a binder around the toe end of an upper to hold the upper in lasted position in the angle between the feather and the lip of a welt shoe insole, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated wtih each of said throat members and mounted for movements toward each other heightwise of the shoe to engage and position the binder between them in a location between the throat member and the shoe, and pin-and-slot connections between said binder-positioning members and the throat member for thus moving the binder-positioning members toward each other by the movement of the throat member.

27. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and relatively movable heightwise of the shoe to position the binder between them, one at least of each pair of said binder-positioning members having means for engaging the binder held taut by the grippers and for pressing it inwardly toward the upper in response to the inward movement of the throat member associated therewith, and means for effecting the relative movement of the binder-postiioning members of each pair heightwise of the shoe in response to resistance of the binder to the pressure thus applied thereto.

28. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and relatively movable heightwise of the shoe to position the binder between them in a location between the throat member and the shoe, one at least of each pair of said binder-positioning members having means for engaging the binder held taut by the grippers and for pressing it inwardly toward the upper in response to the inward movement of the throat member associated therewith, and means for effecting the relative movement of the binder-positioning members of each pair heightwise of the shoe by the movement of the corresponding throat member in response to resistance of the binder to the pressure thus applied thereto.

29. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and movable toward each other heightwise of the shoe to position the binder between them in a location between the throat member and the shoe, one at least of each pair of said binder-positioning members having means for engaging the binder held taut by the grippers and for pressing it inwardly toward the upper in response to the inward movement of the throat member associated therewith, and pin-and-slot connections between the binder-positioning members of each pair and the corresponding throat member for moving said positioning members toward each other heightwise of the shoe in response to resistance of the binder to the pressure thus applied thereto.

30. In a lasting machine, means for applying a binder around the toe end of an upper to hold the upper in lasted position in the angle between the feather and the lip of a welt shoe insole, drivers for inserting fastenings in directions widthwise of the shoe in the margin of the upper and the lip of the insole at the opposite sides of the shoe respectively to fasten the binder to the shoe, a pair of binder-positioning members associated with each of said drivers and relatively movable heightwise of the shoe to position the binder between them in proper relation to the path of movement of the driver, said members being formed to guide the fastening, and means for moving the binder-positioning members of each pair inwardly toward the shoe and for effecting their relative binder-positioning movement heightwise of the shoe prior to the operation of the driver.

31. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, a pair of binder-positioning members associated with each of said drivers and relatively movable heightwise of the shoe to position the binder between them in proper relation to the path of movement of the driver, means for moving said binder-positioning members inwardly toward the shoe, one at least of each pair of said members having means for engaging the binder held taut by the grippers and for pressing it inwardly toward the upper, and means for effecting the relative binder-positioning movements of said members heightwise of the shoe in response to resistance of the binder to the pressure thus applied thereto.

32. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and relatively movable heightwise of the shoe to position the binder between them, and means for engaging portions of the binder held taut by the grippers and for spacing them widthwise of the shoe from the upper to insure the proper positioning of the binder by said binder-positioning members.

33. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and relatively movable heightwise of the shoe to position the binder between them, and devices arranged to be inserted between the upper and portions of the binder held taut by the grippers to space those portions of the binder from the upper and thereby to insure the proper positioning of the binder by said binder-positioning members.

34. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of said throat members and relatively movable heightwise of the shoe to position the binder between them, and devices mounted for movements heightwise of the shoe in locations between the grippers and said binder-positioning members to space portions of the binder held taut by the grippers from the upper and thereby to insure the proper positioning of the binder by the binder-positioning members.

35. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, throat members associated respectively with the different drivers for guiding the fastenings, means for moving said throat members inwardly toward the shoe prior to the insertion of the fastenings, a pair of binder-positioning members associated with each of the said throat members and relatively movable heightwise of the shoe to position the binder between them, and devices having V-shaped portions of resilient wire arranged to be moved heightwise of the shoe between the upper and portions of the binder held taut by the grippers to space those portions of the binder from the upper and thereby to insure the proper positioning of the binder by said binder-positioning members, said V-shaped portions being contractible by the pressure of the binder thereon.

36. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, a pair of binder-positioning members associated with each of said drivers and relatively movable heightwise of the shoe to position the binder between them in proper relation to the path of movement of the driver, means for moving said binder-positioning members inwardly toward the shoe and for effecting their relative binder-positioning movements heightwise of the shoe, and devices for engaging portions of the binder held taut by the grippers and for spacing them widthwise of the shoe from the upper to insure the proper positioning of the binder by said binder-positioning members.

37. In a lasting machine, grippers for applying a binder around the toe end of an upper to hold the upper in lasted position in the angle between the feather and the lip of a welt shoe insole by pulling the binder lengthwise of the shoe, drivers for inserting fastenings in directions widthwise of the shoe in the margin of the upper and the lip of the insole at the opposite sides of the shoe respectively to fasten the binder to the shoe, a pair of binder-positioning members associated with each of said drivers and relatively movable heightwise of the shoe to position the binder between them in proper relation to the path of movement of the driver, means for moving said binder-positioning members inwardly toward the shoe and for effecting their relative binder-positioning movements heightwise of the shoe, and devices having V-shaped portions of resilient wire mounted for movements heightwise of the shoe between the upper and portions of the binder held taut by the grippers to space those portions of the binder from the upper and thereby to insure the proper positioning of the binder by said binder-positioning members.

38. In a lasting machine, grippers for applying a binder around the toe end of an upper to hold the upper in lasted position in the angle between the feather and the lip of a welt shoe insole by pulling the binder lengthwise of the shoe, mechanisms for inserting fastenings in directions widthwise of the shoe in the margin of the upper and the lip of the insole at the opposite sides of the shoe respectively to fasten the binder to the shoe, said fastening-inserting mechanisms being mounted for movements heightwise of the shoe to fastening-inserting positions and each including a driver for inserting the fastening and a pair of binder-positioning members relatively movable heightwise of the shoe to position the binder between them in proper relation to the driver, and devices carried by said fastening-inserting mechanisms and movable thereby heightwise of the shoe between the upper and portions of the binder held taut by the grippers to space those portions of the binder from the upper and thereby to insure the proper positioning of the binder by said binder-positioning members.

39. In a lasting machine, grippers for applying a binder around the toe end of an upper to hold the upper in lasted position in the angle between the feather and the lip of a welt shoe insole by pulling the binder lengthwise of the shoe, mechanisms for inserting fastenings in directions widthwise of the shoe in the margin of the upper and the lip of the insole at the opposite sides of the shoe respectively to fasten the binder to the shoe, said fastening-inserting mechanisms being mounted for movements heightwise of the shoe to fastening-inserting positions and each including a driver for inserting the fastening and a pair of binder-positioning members relatively movable heightwise of the shoe to position the binder between them in proper relation to the driver, and devices carried by said fastening-inserting mechanisms and movable by said mechanisms heightwise of the shoe in locations between said binder-positioning members and the grippers to space portions of the binder held taut by the grippers from the upper and thereby to insure the proper positioning of the binder by said binder-positioning members, said devices having V-shaped portions of resilient wire arranged to engage the upper and the binder and contractible by the pressure of the binder thereon.

40. In a lasting machine, means for applying a binder around the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, and means for engaging the end portions of the binder beyond the fastenings and for bending said end portions heightwise of the shoe after the insertion of the fastenings.

41. In a lasting machine, means for applying a binder around the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, means for moving said mechanisms heightwise of the shoe in directions away from the shoe after the insertion of the fastenings, and means carried by said mechanisms for engaging the end portions of the binder beyond the fastenings and for bending said end portions heightwise of the shoe as the mechanisms are thus moved away from the shoe.

42. In a lasting machine, means for applying a binder around the toe end of an upper to hold the upper in lasted position in the angle between the feather and the lip of a welt shoe insole, mechanisms for inserting fastenings in directions widthwise of the shoe in the margin of the upper and the lip of the insole at the opposite sides of the shoe respectively to fasten the binder to the shoe, means for moving said mechanisms heightwise of the shoe into fastening-inserting positions and for moving them reversely away from the shoe after the insertion of the fastenings, and devices carried by said mechanisms for engaging the end portions of the binder beyond the fastenings and for bending said end portions heightwise of the shoe in response to the reverse movements of the mechanisms, said devices being arranged to assume positions thus to act on the end portions of the binder in response to the movements of said mechanisms into fastening-inserting positions.

43. In a lasting machine, means for applying a binder around the toe end of an upper to hold the upper in lasted position in the angle between the feather and the lip of a welt shoe insole, said binder-applying means comprising grippers arranged to engage the ends of the binder and to pull it lengthwise of the shoe, mechanisms for inserting fastenings in directions widthwise of the shoe in the margin of the upper and the lip of the insole at the opposite sides of the shoe respectively to fasten the binder to the shoe, means for causing said grippers to release the binder, substantially at the time when the fastenings are inserted, and means for engaging the end portions of the binder beyond the fastenings and for bending said end portions heightwise of the shoe after the insertion of the fastenings and the release of the binder by the grippers.

44. In a lasting machine, means for applying a binder around the toe end of an upper to hold the upper in lasted position in the angle between the feather and the lip of a welt shoe insole, said binder-applying means comprising grippers arranged to engage the ends of the binder and to pull it lengthwise of the shoe, mechanisms for inserting fastenings in directions widthwise of the shoe in the margin of the upper and the lip of the insole at the opposite sides of the shoe respectively to fasten the binder to the shoe, means for causing said grippers to release the binder substantially at the time when the fastenings are inserted, means for moving said mechanisms heightwise of the shoe into fastening-inserting positions and for moving them reversely away from the shoe after the insertion of the fastenings and the release of the binder by the grippers, and devices carried by said mechanisms for engaging the end portions of the binder beyond the fastenings and for bending said end portions heightwise of the shoe in response to the reverse movements of the mechanisms, said devices comprising hook-shaped members arranged to be carried to positions thus to act on the binder by the movements of said mechanisms into fastening-inserting positions.

45. In a lasting machine, means for applying a binder around the toe end of an upper to hold the upper in lasted position in the angle between the feather and the lip of a welt shoe insole, stapling units for forming staples and for inserting them in directions widthwise of the shoe in the margin of the upper and the lip of the insole at the opposite sides of the shoe respectively to fasten the binder to the shoe, and said units being mounted for swinging movements heightwise of the shoe to positions determined by engagement with the insole and each including a staple-forming member and a toggle for operating it, each staple-forming member having a cutter movable therewith to cut from wire a piece to form a staple, means arranged to act through the toggle of each unit first to swing the unit heightwise of the shoe by reason of resistance of the wire to movement of the staple-forming member and cutter and then to operate said cutter and member to cut the wire and to form a staple, and additional means for applying to each unit force tending to prevent reverse movement thereof heightwise of the shoe after the cutting of the wire.

46. In a lasting machine, means for applying a binder around the toe end of an upper to hold the upper in lasted position in the angle between the feather and the lip of a welt shoe insole, stapling units for forming staples and for inserting them in directions widthwise of the shoe in the margin of the upper and the lip of the insole at the opposite sides of the shoe respectively to fasten the binder to the shoe, said units being mounted for swinging movements heightwise of the shoe to positions determined by engagement with the insole and each including a staple-forming member and a toggle for operating it, each staple-forming member having a cutter movable therewith to cut from wire a piece to form a staple, means arranged to act through the toggle of each unit first to swing the unit heightwise of the shoe by reason of resistance of the wire to movement of the staple-forming member and cutter and then to operate said cutter and member to cut the wire and to form a staple, a spring carried by each unit, and means for applying to each unit through said spring force tending to prevent reverse movement thereof heightwise of the shoe after the cutting of the wire.

47. In a lasting machine, means for applying a binder around the toe end of an upper to hold the upper in lasted position in the angle between the feather and the lip of a welt shoe insole, stapling units for forming staples and for inserting them in directions widthwise of the shoe in the margin of the upper and the lip of the insole at the opposite sides of the shoe respectively to fasten the binder to the shoe, said units being mounted for swinging movements heightwise of the shoe to positions determined by engagement with the insole and each including a staple-forming member and a toggle for operating it, each staple-forming member having a cutter movable therewith to cut from wire a piece to form a staple, means arranged to act through the toggle of each unit first to swing the unit heightwise of the shoe by reason of resistance of the wire to movement of the staple-forming member and cutter and then to operate said cutter and member to cut the wire and to form a staple, an arm mounted for swinging movement on each unit, a spring against resistance of which said arm is thus movable, and means for swinging the arm by the toggle to apply to the unit force tending to prevent reverse movement thereof heightwise of the shoe after the cutting of the wire.

48. In a lasting machine, means for applying a binder around the toe end of an upper to hold the upper in lasted position in the angle between the feather and the lip of a welt shoe insole, stapling units having means for forming staples and for inserting them in directions widthwise of the shoe in the margin of the upper and the lip of the insole at the opposite sides of the shoe respectively to fasten the binder to the shoe, means for moving said units downwardly to staple-inserting positions and for thereafter moving them reversely upward to initial positions, means for limiting their upward movements, means included in each unit for feeding staple-forming wire from a source of supply in response to the downward movement of the unit ready to be received within the unit as the unit is moved upwardly, each unit having means for engaging the end of the wire and for lifting the wire near the end of its upward movement, a brake member arranged to engage the wire and past which the wire is fed downwardly by the unit, and means for guiding the wire between the unit and said brake member, the brake member being mounted to move upwardly with the wire in response to the upward movement of the wire by the unit.

49. In a lasting machine, means for applying a binder around the toe end of an upper to hold the upper in lasted position in the angle between the feather and the lip of a welt shoe insole, stapling units having means for forming staples and for inserting them in directions widthwise of the shoe in the margin of the upper and the lip of the insole at the opposite sides of the shoe respectively to fasten the binder to the shoe, means for moving said units downwardly to staple-inserting positions and for thereafter moving them reversely upward to initial positions, means for limiting their upward movements, means included in each unit for feeding staple-forming wire from a source of supply in response to the downward movement of the unit ready to be received within the unit as the unit is moved upwardly, each unit having means for engaging the end of the wire and for lifting the wire near the end of its upward movement, a brake member arranged to engage the wire and past which the wire is fed downwardly by the unit, a flexible conduit connected at its lower end to each unit for guiding the wire, said conduit being movable downwardly and upwardly with the unit, and a non-flexible tube surrounding said conduit, said tube and the brake member being mounted to move upwardly with the wire in response to the upward movement of the wire by the unit.

50. In a lasting machine, means for applying a binder around the toe end of an upper to hold the upper in lasted position in the angle between the feather and the lip of a welt shoe insole, stapling units having means for forming staples and for inserting them in directions widthwise of the shoe in the margin of the upper and the lip of the insole at the opposite sides of the shoe respectively to fasten the binder to the shoe, means for moving said units downwardly into staple-inserting positions and for thereafter moving them reversely upward to initial positions, means for limiting their upward movements, means included in each unit for feeding staple-forming wire from a source of supply in response to the downward movement of the unit ready to be received within the unit as the unit is moved upwardly, each unit having means for engaging the end of the wire and for lifting the wire near the end of its upward movement, a brake member arranged to engage the wire and past which the wire is fed downwardly by the unit, the brake member being mounted to move upwardly with the wire in response to the upward movement of the wire by the unit, and means for limiting independently of the unit downward movement of the brake member when the unit is moved downwardly.

51. In a lasting machine, means for applying a binder around the toe end of an upper to hold the upper in lasted position in the angle between the feather and the lip of a welt shoe insole, stapling units having means for forming staples and for inserting them in directions widthwise of the shoe in the margin of the upper and the lip of the insole at the opposite sides of the shoe respectively to fasten the binder to the shoe, means for moving said units downwardly into staple-inserting positions and for thereafter moving them reversely upward to initial positions, means for limiting their upward movements, means included in each unit for feeding staple-forming wire from a source of supply in response to the downward movement of the unit ready to be received within the unit as the unit is moved upwardly, each unit having means for engaging the end of the wire and for lifting the wire near the end of its upward movement, a brake member arranged to engage the wire and past which the wire is fed downwardly by the unit, a support for said brake member, said support and brake member being mounted to move upwardly with the wire in response to the upward movement of the wire by the unit, a non-flexible tube secured to said support to move therewith and arranged to assist in guiding the wire between the brake member and the unit, and a guide in which said tube is slidingly movable, said guide being arranged to limit downward movement of the tube and the brake member when the unit is moved downwardly.

52. In a lasting machine, means for applying a binder around the toe end of an upper to hold the upper in lasted position in the course of a cycle of power operations of the machine, a motor for operating the machine through the cycle, automatic means for interrupting the cycle after the binder has thus been applied, a fluid-operated means for inserting fastenings to fasten the binder to the shoe in the ensuing pause in the cycle, a pump driven by said motor for supplying operating fluid under pressure to said fluid-operated means, a valve for admitting the fluid to said fluid-operated means, automatic means for moving said valve thus to admit the fluid prior to the pause in the cycle, the valve being further optionally movable by the operator into position to admit the fluid independently of any cycle of operations of the machine, a device for retaining the valve in that position, a spring for returning the valve if not retained by said device, and means for preventing said device from thus retaining the valve if the valve is thus moved by the operator when the motor is not running.

53. In a lasting machine, means for applying a binder around the toe end of an upper to hold the upper in lasted position in the course of a cycle of power operations of the machine, an electric motor for operating the machine through the cycle, automatic means for interrupting the cycle after the binder has thus been applied, fluid-operated means for inserting fastenings to fasten the binder to the shoe in the ensuing pause in the cycle, a pump driven by said motor for supplying operating fluid under pressure to said fluid-operated means, a valve for admitting the fluid to said fluid-operated means, automatic means for moving said valve thus to admit the fluid prior to the pause in the cycle, the valve being further optionally movable by the operator into position to admit the fluid independently of any cycle of operations of the machine, a device for retaining the valve in that position, a spring for returning the valve if not retained by said device, and means controlled by the electrical circuit of said motor for preventing said device from thus retaining the valve if the valve is thus moved by the operator when the motor is not running.

54. In a lasting machine, means for applying a binder around the toe end of an upper to hold the upper in lasted position in the course of a cycle of power operations of the machine, an electric motor for operating the machine through the cycle, automatic means for interrupting the cycle after the binder has thus been applied, fluid-operated means for inserting fastenings to fasten the binder to the shoe in the ensuing pause in the cycle, a pump driven by said motor for supplying operating fluid under pressure to said fluid-operated means, a valve for admitting the fluid to said fluid-operated means, automatic means for moving said valve thus to admit the fluid prior to the pause in the cycle, means optionally movable by the operator to move the valve into position to admit the fluid independently of any cycle of operations of the machine, a latch for retaining the valve in that position, a spring for returning the valve if not retained by said latch, the latch being so positioned as to prevent it from thus retaining the valve if the valve is thus moved by the operator when the motor is not running, and a solenoid in circuit with said motor for causing the latch to assume a position for thus acting on the valve upon the starting of the motor.

55. In a lasting machine, means for applying a binder around the toe end of an upper to hold the upper in lasted position in the course of a cycle of power operations of the machine, an electric motor for operating the machine through the cycle, automatic means for interrupting the cycle after the binder has thus been applied, fluid-operated means for inserting fastenings to fasten the binder to the shoe in the ensuing pause in the cycle, a pump driven by said motor for supplying fluid under pressure to said fluid-operated means, a valve for admitting the fluid to said fluid-operated means, automatic means for moving said valve thus to admit the fluid prior to the pause in the cycle, means optionally movable by the operator to move the valve into position to admit the fluid independently of any cycle of operations of the machine, a latch for retaining the valve in that position, a spring for returning the valve if not retained by said latch, and means responsive to the breaking of the electrical circuit of said motor for moving the latch into position to prevent it from thus retaining the valve if the valve is thus moved by the operator when the motor is not running.

56. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid prior to the pause in the cycle, means for alternatively preventing said automatic means from thus acting on the valve, a member optionally movable by the operator to move the valve into position thus to admit the fluid, and means for preventing such movement of the valve by the operator except prior to the starting of the cycle or during the pause in the cycle.

57. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid prior to the pause in the cycle, means for alternatively preventing said automatic means for thus acting on the valve, a member optionally movable by the operator to move the valve into position to admit the fluid, a device movable by said member, and means movable in the cycle of operations for engaging said device to prevent valve-operating movement of said member except prior to the starting of the cycle or during the pause in the cycle.

58. In a lasting machine, means for applying a binder around the toe end of an upper to hold the upper in lasted position in the course of a cycle of power operations of the machine, automatic means for interrupting the cycle after the binder has thus been applied, power-operated means for inserting fastenings to fasten the binder to the shoe in the ensuing pause in the cycle, automatic means for starting the operation of said fastening-inserting means prior to the pause in the cycle, a member optionally movable by the operator to cause said fastening-inserting means to operate independently of any cycle of operations of the machine, and means also optionally movable to prevent such operation of the fastening-inserting means regardless of the movement of said member.

59. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid prior to the pause in the cycle, a member optionally movable by the operator thus to move said valve independently of any cycle of operations of the machine, and means also optionally movable to prevent such movement of the valve regardless of the movement of said member.

60. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, a valve-operating member, automatic means for moving said member to cause the valve thus to admit the fluid prior to the pause in the cycle, said valve-operating member being also optionally movable by the operator to cause the operation of the fastening-inserting means independently of any cycle of operations of the machine but being displaceable to prevent it from acting on the valve regardless of its movement, and means for optionally thus displacing said member and for maintaining it in displaced position.

61. In a lasting machine, means for applying a binder around the toe end of an upper to hold the upper in lasted position in the course of a cycle of power operations of the machine, automatic means for interrupting the cycle after the binder has thus been applied, power-operated means for inserting fastenings to fasten the binder to the shoe in the ensuing pause in the cycle, automatic means for starting the operation of said fastening-inserting means, and means dependent upon the absence of a shoe for preventing the operation of said fastening-inserting means if there is no shoe in the machine.

62. In a lasting machine, means for applying a binder around the toe end of an upper to hold the upper in lasted position in the course of a cycle of power operations of the machine, automatic means for interrupting the cycle after the binder has thus been applied, power-operated means for inserting fastenings to fasten the binder to the shoe in the ensuing pause in the cycle, automatic means for starting the operation of said fastening-inserting means prior to the pause in the cycle, and means dependent upon the absence of a shoe for preventing such starting of the fastening-inserting means if there is no shoe in the machine.

63. In a lasting machine, means for applying a binder around the toe end of an upper to hold the upper in lasted position in the course of a cycle of power operations of the machine, automatic means for interrupting the cycle after the binder has thus been applied, power-operated means for inserting fastenings to fasten the binder to the shoe in the ensuing pause in the cycle, automatic means for starting the operation of said fastening-inserting means, a member movable in the cycle of operations and thus movable a greater distance if there is no shoe in the machine, and means responsive to the excess movement of said member in the absence of a shoe for preventing the operation of said fastening-inserting means.

64. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid, and means dependent upon the absence of a shoe for preventing such movement of the valve if there is no shoe in the machine.

65. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid, a member movable in the cycle of operations and thus movable a greater distance if there is no shoe in the machine, and means arranged to be operated by the excess movement of said member to prevent such movement of the valve in the absence of a shoe.

66. In a lasting machine, means for applying a binder around the toe end of an upper to hold the upper in lasted position in the course of a cycle of power operations of the machine, automatic means for interrupting the cycle after the binder has thus been applied, fluid-operated means for inserting fastenings to fasten the binder to the shoe in the ensuing pause in the cycle, a valve for admitting fluid to said fluid-operated means, a valve-operating member, automatic means for moving said member prior to the pause in the cycle to cause the valve thus to admit the fluid, said valve-operating member being displaceable to prevent it from acting on the valve regardless of its movement, and means dependent upon the absence of a shoe for thus displacing said member and for thereby preventing the operation of said fastening-inserting means if there is no shoe in the machine.

67. In a lasting machine, means for applying a binder around the toe end of an upper to hold the upper in lasted position in the course of a cycle of power operations of the machine, a clutch through which parts of the machine are operated in the course of the cycle, a member movable by the operator to actuate said clutch and thus to start the cycle of operations, automatic means for interrupting the cycle by control of said clutch after the binder has thus been applied, power-operated means for inserting fastenings to fasten the binder to the shoe in the ensuing pause in the cycle, automatic means for starting the operation of said fastening-inserting means, and means for preventing any accidental actuation of the clutch by the operator during the operation of said fastening-inserting means.

68. In a lasting machine, means for applying a binder around the toe end of an upper to hold the upper in lasted position in the course of a cycle of power operations of the machine, a clutch through which portions of the machine are operated in the course of the cycle, a treadle for actuating said clutch to start the cycle, automatic means for interrupting the cycle by control of said clutch after the binder has thus been applied, power-operated means for inserting fastenings to fasten the binder to the shoe in the ensuing pause in the cycle, automatic means for starting the operation of said fastening-inserting means, and a device automatically movable into position to prevent clutch-actuating movement of the treadle during the operation of the fastening-inserting means.

69. In a lasting machine, means for applying a binder around the toe end of an upper to hold the upper in lasted position in the course of a cycle of power operations of the machine, a clutch through which portions of the machine are operated in the course of the cycle, means movable by the operator to actuate said clutch and thus to start the cycle of operations, automatic means for interrupting the cycle by control of said clutch after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid, and a device movable as the valve is thus operated into position to prevent any accidental actuation of the clutch by the operator during the operation of the fastening-inserting means.

70. In a lasting machine, means for applying a binder around the toe end of an upper to hold the upper in lasted position in the course of a cycle of power operations of the machine, a clutch through which portions of the machine are operated in the course of the cycle, a treadle movable by the operator to actuate said clutch and thus to start the cycle of operations, automatic means for interrupting the cycle by control of said clutch after the binder has thus been applied, fluid-operated means for inserting fastenings to fasten the binder to the shoe in the ensuing pause in the cycle, a valve for admitting fluid to said fluid-operated means, automatic means for operating said valve thus to admit the fluid, and a member movable by said valve-operating means into position to prevent clutch-actuating movement of the treadle during the operation of said fastening-inserting means.

71. In a lasting machine, means for applying a binder around the toe end of an upper to hold the upper in lasted position in the course of a cycle of power operations of the machine, a clutch through which portions of the machine are operated in the course of the cycle, a member movable by the operator to actuate said clutch and thus to start the cycle of operations, automatic means for interrupting the cycle by control of said clutch after the binder has thus been applied, power-operated means for inserting fastenings to fasten the binder to the shoe in the ensuing pause in the cycle, automatic means for starting the operation of said fastening-inserting means prior to the pause in the cycle, a member optionally movable by the operator to cause said fastening-inserting means to operate independently of any cycle of operations on the machine, and a device movable by said last-named member into position to prevent actuation of the clutch by the operator during the operation of said fastening-inserting means.

72. In a lasting machine, means for applying a binder around the toe end of an upper to hold the upper in lasted position in the course of a cycle of power operations of the machine, a clutch through which portions of the machine are operated in the course of the cycle, a treadle movable by the operator to actuate said clutch and thus to start the cycle of operations, automatic means for interrupting the cycle by control of said clutch after the binder has thus been applied, fluid-operated means for inserting fastenings to fasten the binder to the shoe in the ensuing pause in the cycle, a valve for admitting fluid to said fluid-operated means, automatic means for moving said valve thus to admit the fluid prior to the pause in the cycle, a member optionally movable by the operator thus to move said valve independently of any cycle of operations of the machine, and means movable by said member into position to prevent clutch-actuating movement of said treadle during the operation of the fastening-inserting means.

PHILIP E. BURBY.

References Cited in the file of this patent

UNITED STATES PATENTS

| Number | Name | Date |
|---|---|---|
| 997,228 | Bartholomew et al. | July 4, 1911 |
| 1,454,898 | Lee | May 15, 1923 |
| 1,525,457 | MacDonald | Feb. 10, 1925 |
| 1,630,402 | Monahan | May 31, 1927 |
| 1,761,030 | Zwiebel | June 3, 1930 |
| 2,200,284 | Lewis | May 14, 1940 |
| 2,420,684 | Robinson | May 20, 1947 |